(12) United States Patent
Kim et al.

(10) Patent No.: US 10,832,411 B2
(45) Date of Patent: Nov. 10, 2020

(54) ELECTRONIC APPARATUS AND METHOD OF CONTROLLING THE SAME

(71) Applicant: SAMSUNG ELECTRONICS CO., LTD., Suwon-si (KR)

(72) Inventors: Sung-hyun Kim, Yongin-si (KR); Bo-eun Kim, Seoul (KR); Seung-hoon Baek, Daegu (KR); Yong-deok Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 15/696,383

(22) Filed: Sep. 6, 2017

(65) Prior Publication Data

US 2018/0075604 A1 Mar. 15, 2018

(30) Foreign Application Priority Data

Sep. 9, 2016 (KR) .................. 10-2016-0116570

(51) Int. Cl.
*G06T 7/10* (2017.01)
*G06T 3/00* (2006.01)
(Continued)

(52) U.S. Cl.
CPC .............. *G06T 7/10* (2017.01); *G06F 3/147* (2013.01); *G06T 3/0056* (2013.01); *G06T 11/60* (2013.01);
(Continued)

(58) Field of Classification Search
CPC .......... G06T 7/10; G06T 11/60; G06T 3/0056
See application file for complete search history.

(56) References Cited

U.S. PATENT DOCUMENTS

| 6,339,431 B1 * | 1/2002 | Ohmori ................ G06F 3/0481 345/585 |
| 6,919,892 B1 * | 7/2005 | Cheiky .................. G06T 13/40 345/473 |

(Continued)

FOREIGN PATENT DOCUMENTS

| CN | 204761606 U | 11/2015 |
| CN | 105204619 A | 12/2015 |

(Continued)

OTHER PUBLICATIONS

Nathan Yau, "Map projections illustrated with a face", Flowingdata, Jan. 13, 2014, Retrieved from internet—https://flowingdata.com/2014/01/13/map-projections-illustrated-with-a-face/ (two (2) pages total).

(Continued)

*Primary Examiner* — Mia M Thomas
(74) *Attorney, Agent, or Firm* — Sughrue Mion, PLLC

(57) ABSTRACT

An electronic apparatus and a method of controlling the electronic apparatus are provided. The electronic apparatus includes a display configured to display an image, and a controller electrically connected to the display. The controller is configured to control the display to display a region of the image, using a first reproducing method, identify either one or both of a first event in which a control signal is externally received and a second event occurring based on a result of analyzing a feature of the region of the image, and change the first reproducing method to a second reproducing method, based on either one or both of the first event and the second event being identified.

19 Claims, 14 Drawing Sheets

US 10,832,411 B2
Page 2

(51) Int. Cl.
| | |
|---|---|
| *G06T 11/60* | (2006.01) |
| *H04N 21/431* | (2011.01) |
| *H04N 21/4402* | (2011.01) |
| *G09G 3/00* | (2006.01) |
| *G09G 5/00* | (2006.01) |
| *H04N 21/44* | (2011.01) |
| *G09G 5/02* | (2006.01) |
| *H04N 5/232* | (2006.01) |
| *H04N 21/6587* | (2011.01) |
| *G06F 3/147* | (2006.01) |
| *H04N 21/4728* | (2011.01) |
| *G09G 5/14* | (2006.01) |
| *G09G 3/20* | (2006.01) |
| *H04N 5/445* | (2011.01) |
| *H04N 21/81* | (2011.01) |
| *H04N 21/41* | (2011.01) |

(52) U.S. Cl.
CPC ............. *G09G 3/003* (2013.01); *G09G 3/20* (2013.01); *G09G 5/00* (2013.01); *G09G 5/026* (2013.01); *G09G 5/14* (2013.01); *H04N 5/23238* (2013.01); *H04N 21/4316* (2013.01); *H04N 21/4318* (2013.01); *H04N 21/44008* (2013.01); *H04N 21/440245* (2013.01); *H04N 21/4728* (2013.01); *H04N 21/6587* (2013.01); *G09G 2320/10* (2013.01); *G09G 2340/045* (2013.01); *G09G 2340/14* (2013.01); *G09G 2380/02* (2013.01); *H04N 21/4104* (2013.01); *H04N 21/431* (2013.01); *H04N 21/816* (2013.01); *H04N 2005/44573* (2013.01)

(56) References Cited

U.S. PATENT DOCUMENTS

| | | | | |
|---|---|---|---|---|
| 7,027,054 | B1* | 4/2006 | Cheiky | G06T 13/40 345/473 |
| 7,606,397 | B2* | 10/2009 | Kowald | G06K 9/00221 345/619 |
| 7,783,983 | B1* | 8/2010 | Mayers | G06F 3/0481 715/764 |
| 8,218,007 | B2* | 7/2012 | Lee | B62D 15/0275 348/148 |
| 8,462,210 | B2* | 6/2013 | Katoh | B60R 1/00 340/435 |
| 9,883,101 | B1 | 1/2018 | Aloumanis et al. | |
| 10,140,746 | B2* | 11/2018 | Masuda | G06T 11/60 |
| 2004/0131330 | A1* | 7/2004 | Wilkins | G11B 27/031 386/281 |
| 2005/0162624 | A1* | 7/2005 | Miyasaka | G03B 21/142 353/101 |
| 2005/0174459 | A1* | 8/2005 | Naka | H04N 5/232 348/333.01 |
| 2006/0126963 | A1* | 6/2006 | Sonoda | G11B 27/034 382/276 |
| 2006/0150099 | A1* | 7/2006 | Laff | G06F 3/0481 715/708 |
| 2006/0265731 | A1* | 11/2006 | Matsuda | G11B 27/034 725/131 |
| 2007/0061862 | A1 | 3/2007 | Berger et al. | |
| 2009/0066842 | A1* | 3/2009 | Hattori | G06T 3/0018 348/607 |
| 2010/0007665 | A1* | 1/2010 | Smith | G06T 13/40 345/473 |
| 2010/0299630 | A1* | 11/2010 | McCutchen | H04N 7/18 715/803 |
| 2011/0122127 | A1* | 5/2011 | Ko | H04N 21/44218 345/419 |
| 2012/0102435 | A1* | 4/2012 | Han | H04N 13/139 715/848 |
| 2012/0218307 | A1* | 8/2012 | Lin | G06F 3/0482 345/660 |
| 2013/0057542 | A1* | 3/2013 | Takenaka | G06T 3/0031 345/419 |
| 2013/0076856 | A1* | 3/2013 | Wakabayashi | G03B 37/02 348/36 |
| 2013/0219299 | A1* | 8/2013 | Yerli | G06F 3/0481 715/753 |
| 2013/0278630 | A1* | 10/2013 | Cote | G06T 9/00 345/629 |
| 2014/0176542 | A1 | 6/2014 | Shohara et al. | |
| 2014/0245223 | A1* | 8/2014 | Park | G06F 3/0488 715/800 |
| 2016/0050368 | A1 | 2/2016 | Seo et al. | |
| 2016/0098187 | A1* | 4/2016 | Kim | G06F 3/04817 715/768 |

FOREIGN PATENT DOCUMENTS

| | | | |
|---|---|---|---|
| EP | 0 913 993 A1 | 5/1999 | |
| EP | 2 568 436 A1 | 3/2013 | |
| KR | 10-2014-0106795 A | 4/2001 | |
| KR | 10-2016-0021501 A | 2/2016 | |
| WO | 2014/181532 A1 | 11/2014 | |

OTHER PUBLICATIONS

Search Report dated Dec. 12, 2017 issued by the International Searching Authority in counterpart International Patent Application No. PCT/KR2017/009667 (PCT/ISA/210).
Written Opinion dated Dec. 12, 2017 issued by the International Searching Authority in counterpart International Patent Application No. PCT/KR2017/009667 (PCT/ISA/237).
Communication dated Feb. 27, 2019, issued by the European Patent Office in counterpart European Application No. 17849047.0.
Communication dated Jul. 30, 2020, from the European Patent Office in European Application No. 17849047.0.
Communication dated Jul. 9, 2020, from The China National Intellectual Property Administration in Application No. 201780047236.2.

* cited by examiner

FIG. 1
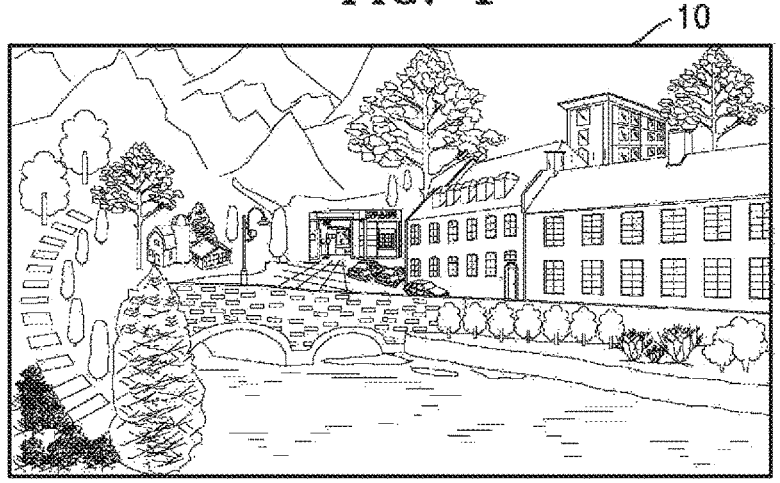
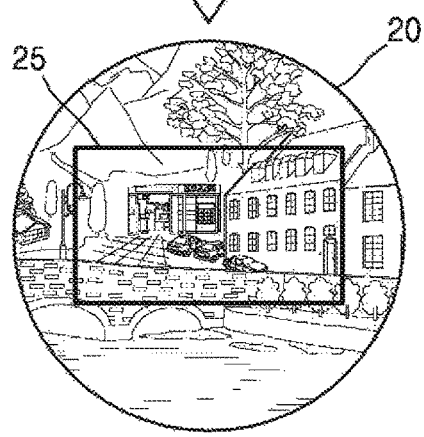
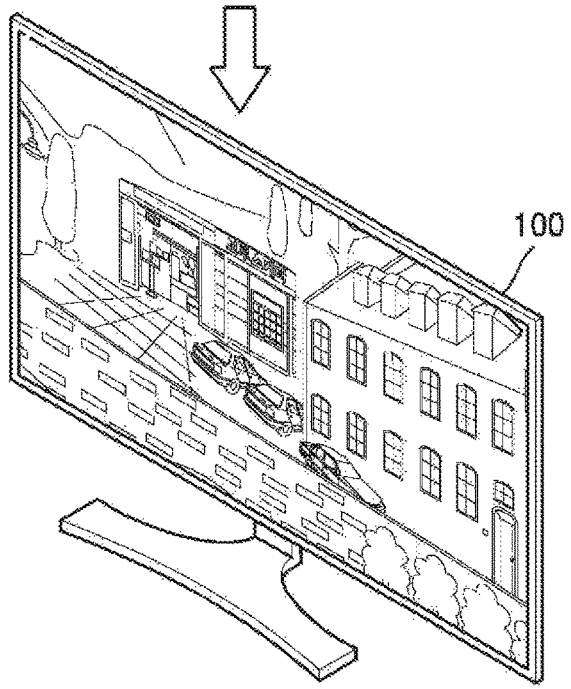

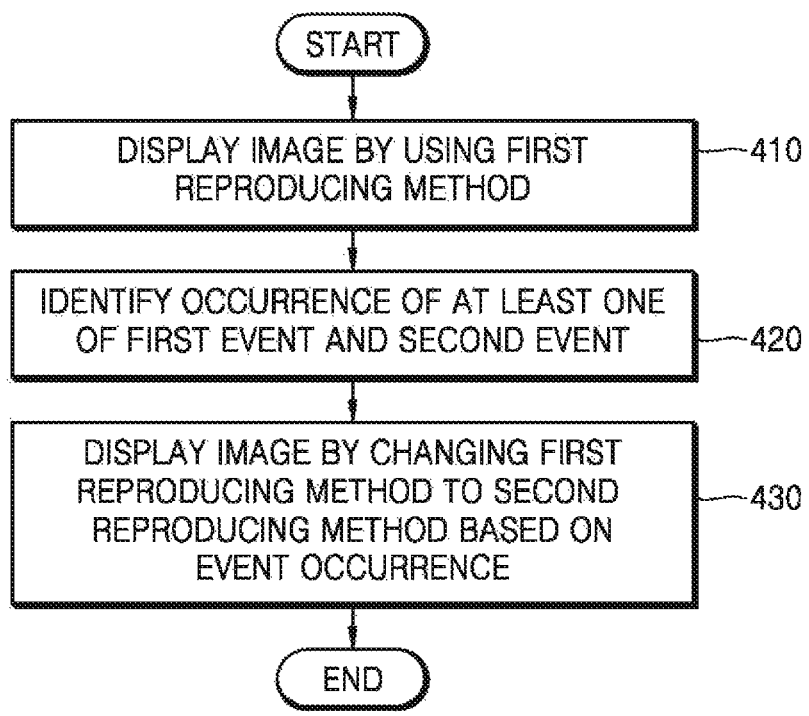

FIG. 8A
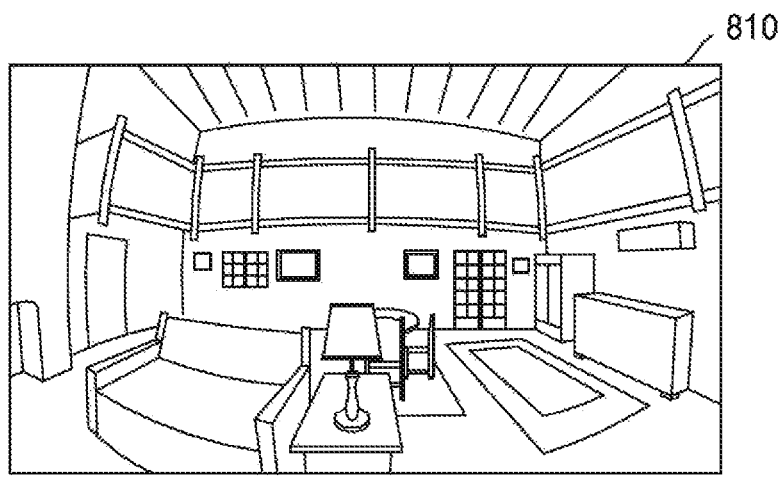
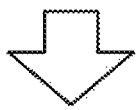
FIG. 8B
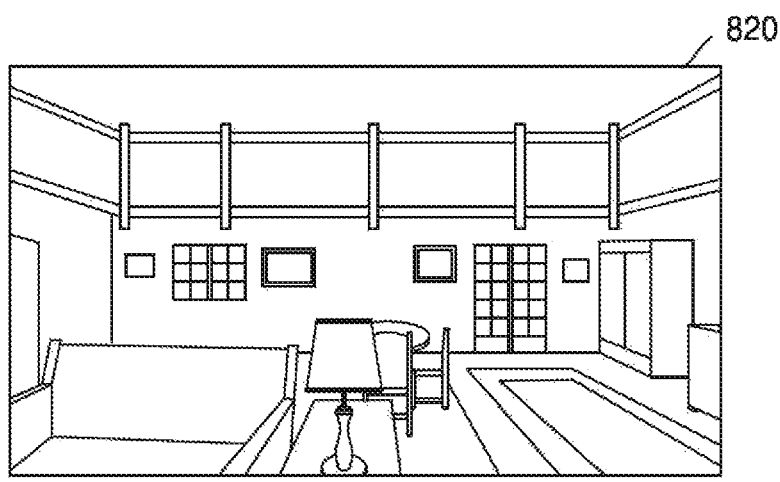

FIG. 9A
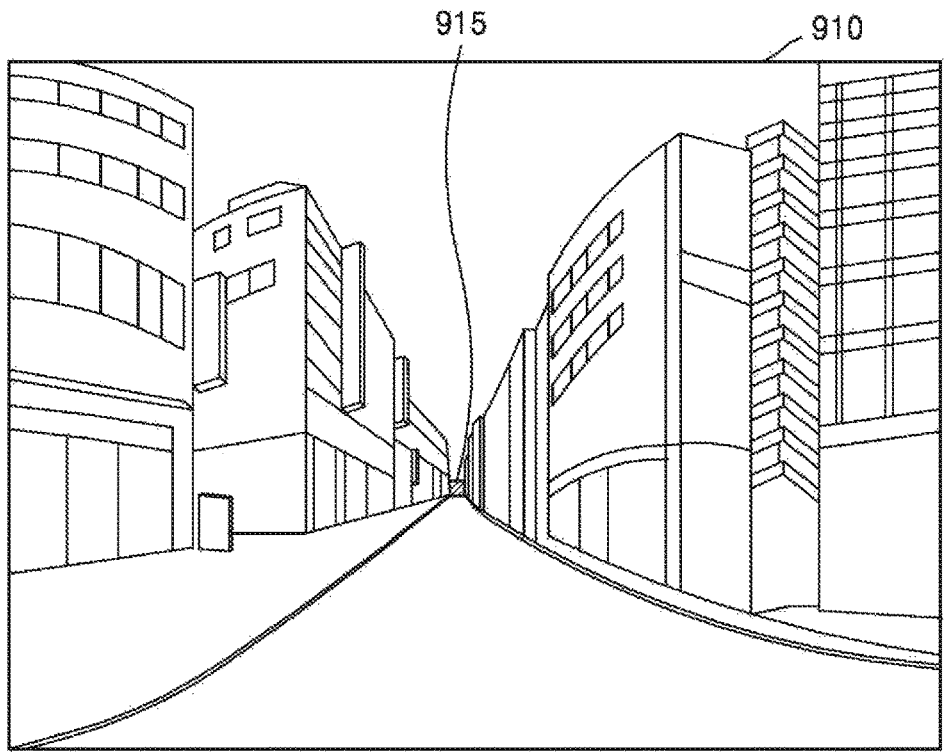
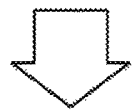
FIG. 9B
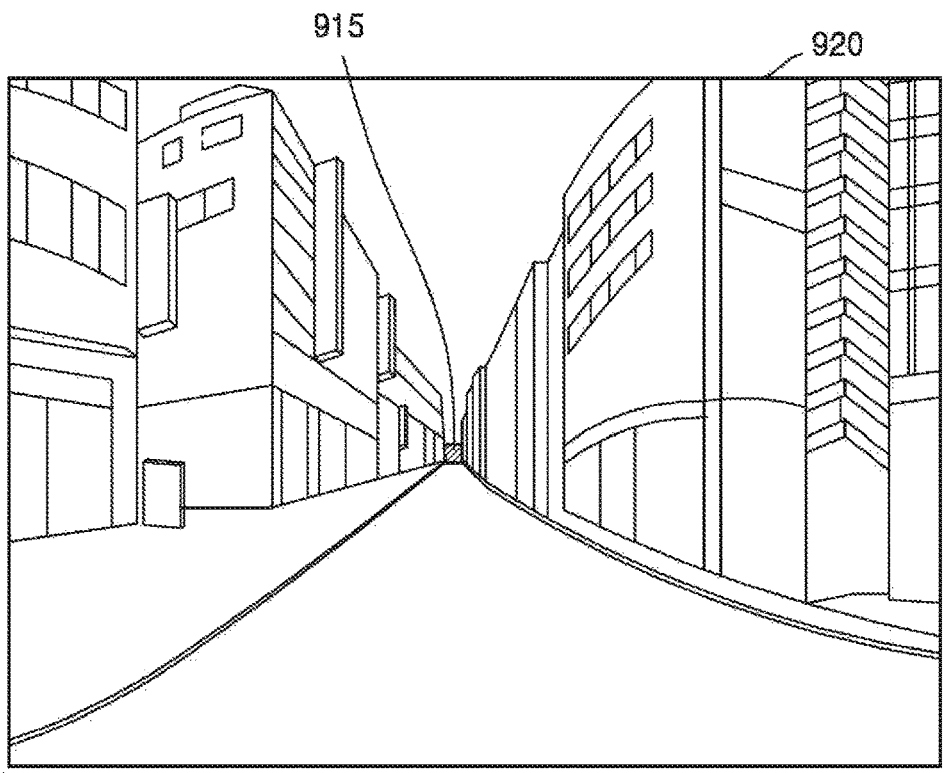

FIG. 13A
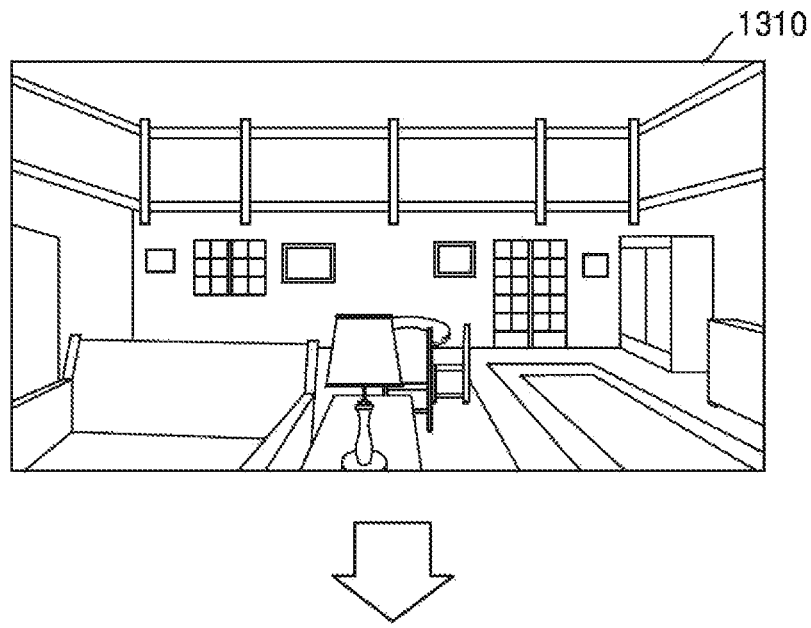
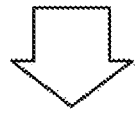
FIG. 13B
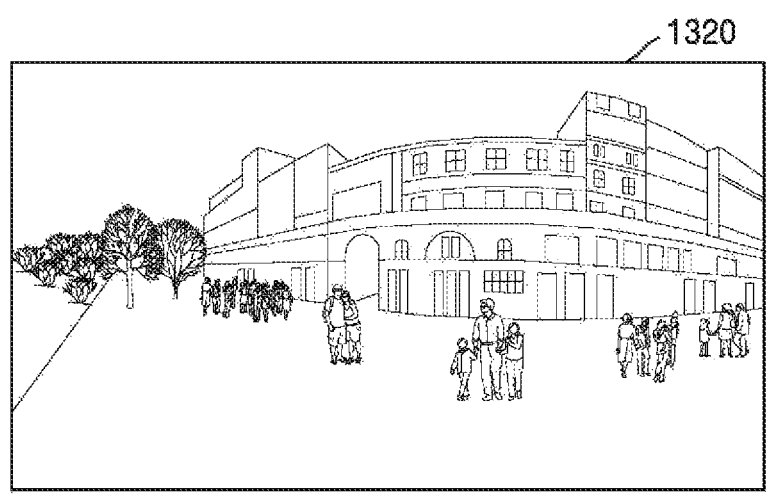

ELECTRONIC APPARATUS AND METHOD OF CONTROLLING THE SAME

CROSS-REFERENCE TO RELATED APPLICATION

This application claims priority from Korean Patent Application No. 10-2016-0116570, filed on Sep. 9, 2016, in the Korean Intellectual Property Office, the disclosure of which is incorporated herein by reference in its entirety.

BACKGROUND

1. Field

Apparatuses and methods consistent with example embodiments relate to an image display method using an electronic apparatus, and more particularly, to an electronic apparatus for displaying a 360 degree image and a method of operating such an electronic apparatus.

2. Description of the Related Art

An electronic apparatus that includes a display or is electrically connectable to a display may display an image that a user may view. The user may view a broadcast through the electronic apparatus. The electronic apparatus displays, on the display, broadcast content according to a broadcast signal selected by the user from broadcasting signals transmitted from broadcast stations. Currently, broadcasting has recently been globally changing from analog broadcasting to digital broadcasting.

Digital broadcasting refers to broadcasting that transmits digital images and audio signals. The digital broadcasting is resistant to external noise and thus has low data loss, is advantageous for error correction, has high resolution, and provides a clear screen, as compared to analog broadcasting. Furthermore, a bidirectional service is available in the digital broadcasting unlike the analog broadcasting.

In addition, smart televisions (TVs) that provide various pieces of content in addition to a digital broadcasting function have been recently provided. A goal of a smart TV is not to operate manually according to a user's selection, but is to analyze and provide what the user desires without the user's manipulation.

The electronic apparatus may also reproduce panoramic images or captured 360 degree images, which are recently increasingly popular. However, there is a problem in that the electronic apparatus displays an image by using a constant reproducing method regardless of a reproduction state of the image.

SUMMARY

An electronic apparatus is provided for displaying an image by changing a reproducing method being used to another reproducing method by analyzing an event occurrence, such as zoom-in, zoom-out, etc., during image reproduction, or characteristics of a reproduced screen. A method of controlling such an electronic apparatus is further provided.

According to example embodiments there is provided an electronic apparatus includes a display configured to display an image, and a controller electrically connected to the display. The controller is configured to control the display to display a region of the image, using a first reproducing method, identify either one or both of a first event in which a control signal is externally received and a second event occurring based on a result of analyzing a feature of the region of the image, and change the first reproducing method to a second reproducing method, based on either one or both of the first event and the second event being identified.

The first event in which the control signal may be externally received includes any one or any combination of a zoom-in signal, a zoom-out signal, and a change signal for changing a first reproduction region to a second reproduction region, being received.

The controller may be further configured to, in response to the first reproducing method to the second reproducing method being changed based on the first event in which the change signal for changing the first reproduction region to the second reproduction region is received, display an entire portion of the image, using the second reproducing method, and display a first user interface indicating a first location of the first reproduction region, on the entire portion of the image that is displayed.

The controller may be further configured to display a second user interface indicating a second location of the second reproduction region, on the entire portion of the image that is displayed.

The controller may be further configured to change, based on an external signal input, a location or a size of the second user interface that is displayed.

The second event occurring based on the result of the analyzing the feature of the region of the image may include a first case of the second event occurring based on a proportion of a face in the region of the image, a first change in a number of faces in the region of the image, a number and an average length of linear components that are detected based on the region of the image, or a second change in an angle of view of the region of the image, and a second case of the second event occurring based on the image changing into another image, or a capturing time and a capturing place of the image changing.

The controller may be further configured to convert the region of the image into an edge image highlighting and displaying a contrast component, detect, from the edge image, the linear components that are horizontal and/or vertical, and in response to the number of the linear components that are detected being greater than a predetermined number, or the average length of the linear components that are detected being greater than a predetermined length, change the first reproducing method to the second reproducing method.

The controller may be further configured to change the first reproducing method to the second reproducing method in response to the number of faces in the region of the image increasing by a predetermined number or greater, or the proportion of the face in the region of the image being greater than or equal to a predetermined value.

The controller may be further configured to, in response to the image changing into the other image, the capturing time and the capturing place of the image changing, or the angle of view of the region of the image changing, change the first reproducing method to the second reproducing method by analyzing another feature of another region that is displayed.

The first reproducing method may include processing the region of the image that is displayed, using a first projection type, and the second reproducing method may include processing the region of the image that is displayed, using a second projection type different from the first projection type.

According to example embodiments there is provided a method of controlling an electronic apparatus including a display, the method including displaying a region of an image, using a first reproducing method, identifying either one or both of a first event in which a control signal is externally received and a second event occurring based on a result of analyzing a feature of the region of the image, and changing the first reproducing method to a second reproducing method, based on either one or both of the first event and the second event being identified.

The method may further include, in response to the first reproducing method to the second reproducing method being changed based on the first event in which the change signal for changing the first reproduction region to the second reproduction region is received, displaying an entire portion of the image, using the second reproducing method, and displaying a first user interface indicating a first location of the first reproduction region, on the entire portion of the image that is displayed.

The method may further include displaying a second user interface indicating a second location of the second reproduction region, on the entire portion of the image that is displayed.

The method may further include changing, based on an external signal input, a location or a size of the second user interface that is displayed.

The method may further include converting the region of the image into an edge image highlighting and displaying a contrast component, and detecting, from the edge image, the linear components that are horizontal and/or vertical. The changing the first reproducing method to the second reproducing method may include, in response to the number of the linear components that are detected being greater than a predetermined number, or the average length of the linear components that are detected being greater than a predetermined length, changing the first reproducing method to the second reproducing method.

The changing the first reproducing method to the second reproducing method may include changing the first reproducing method to the second reproducing method in response to the number of faces in the region of the image increasing by a predetermined number or greater, or the proportion of the face in the region of the image being greater than or equal to a predetermined value.

The changing the first reproducing method to the second reproducing method may include, in response to the image changing into the other image, the capturing time and the capturing place of the image changing, or the angle of view of the region of the image changing, changing the first reproducing method to the second reproducing method by analyzing another feature of another region that is displayed.

A non-transitory computer-readable storage medium storing instructions for causing a computer to display a region of an image, using a first reproducing method, identifying either one or both of a first event in which a control signal is externally received and a second event occurring based on a result of analyzing a feature of the region of the image, and changing the first reproducing method to a second reproducing method, based on either one or both of the first event and the second event being identified.

According to example embodiments, there is provided an electronic apparatus including a display configured to display an image, and a controller connected to the display. The controller is configured to control the display to display a region of the image, using a first reproduction type, receive a control signal with respect to the region of the image that is displayed, analyze a feature of the region of the image that is displayed, and change the first reproduction type to a second reproduction type different than the first reproduction type, based on either one or both of the control signal that is received and the feature that is analyzed.

The first reproduction type may include one of a rectilinear projection, a Pannini projection, and stereographic projection, and the second reproduction type may include an image reproduction without distortion and/or with a standard angle of view.

The control signal may include any one or any combination of a zoom-in signal, a zoom-out signal, and a change signal for changing the region of the image to another region of the image, and the feature of the region of the image may include any one or any combination of a proportion of a face in the region of the image, a first change in a number of faces in the region of the image, a number and an average length of linear components that are detected based on the region of the image, a second change in an angle of view of the region of the image, a third change of the image into another image, a fourth change of a capturing time and a capturing place of the image.

BRIEF DESCRIPTION OF THE DRAWINGS

The above and/or other aspects will become apparent and more readily appreciated from the following description of example embodiments, taken in conjunction with the accompanying drawings in which:

FIG. 1 is a diagram of views illustrating a situation in which an electronic apparatus displays a 360 degree image, according to example embodiments;

FIG. 4 is a flowchart illustrating a method of displaying an image in the electronic apparatus, according to example embodiments;

FIGS. 8A and 8B are views illustrating a situation in which the electronic apparatus displays an image by changing a reproducing method from a first reproducing method to a second reproducing method based on a zooming operation, according to example embodiments;

FIGS. 9A and 9B are views illustrating a situation in which the electronic apparatus displays an image by changing a reproducing method from a first reproducing method to a second reproducing method based on an automatic zooming operation, according to example embodiments;

FIGS. 13A and 13B are views illustrating a situation in which the electronic apparatus displays an image by changing a reproducing method from a first reproducing method to a second reproducing method by analyzing information related to image capturing included in an image being reproduced, according to example embodiments.

DETAILED DESCRIPTION

Figure 2:
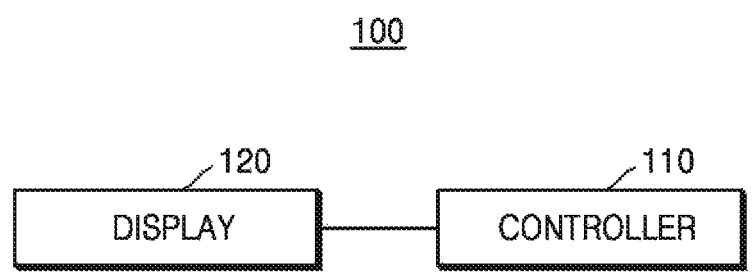
FIG. 2 is a block diagram of a schematic configuration of the electronic apparatus according to example embodiments.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It may be understood that the example embodiments and terminology used herein are not intended to limit the techniques described herein to specific embodiments, but rather to cover various modifications, equivalents, and/or alternatives of the example embodiments. As used here, the singular forms "a" and "an" may include plural forms as well unless the context clearly indicates otherwise. The terms "first" and "second" may represent corresponding elements regardless of the order or importance thereof, and are used to distinguish one element from another and do not limit the corresponding elements. When an element (e.g., a first element) is referred to as being "(functionally or communicatively) connected" or "coupled" to another element (e.g., a second element), it may be directly connected to the other element or may be connected to the other element through another element (e.g., a third element).

In this specification, the term "configured (or set) to ~" may be interchangeably used with, for example, "appropriate for ~," "having an ability to ~," "changed to ~," "made to ~," "capable of ~," or "designed to ~" in a hardware or software manner, according to a situation. In some cases, the term "apparatus configured to ~" may mean that the apparatus may operate with other apparatuses or parts. For example, the term "processor configured (or set) to perform A, B, and C" may refer to a dedicated processor (e.g., an embedded processor) for performing corresponding operations, or a general-purpose processor (e.g., a central processing unit (CPU) or an application processor) capable of performing corresponding operations by executing one or more software programs stored in a memory device.

Electronic apparatuses according to the example embodiments in this specification may include, for example, at least one of a smart phone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MPEG-1 or MPEG-2 Audio Layer III (MP3) player, a medical device, a camera, and a wearable device. The wearable device may include at least one of an accessory-type device (e.g., a watch, a ring, a bracelet, an ankle bracelet, a necklace, glasses, a contact lens, or a head-mounted display (HMD)), a textile or garment integrated device (e.g., electronic clothing), a body attachable type (e.g., a skin pad or a tattoo), and a living body implantable circuit. In the example embodiments, the electronic apparatus may include, for example, at least one of a television, a digital video disk (DVD) player, an audio device, a refrigerator, an air conditioner, a vacuum cleaner, an oven, a microwave oven, a washing machine, an air purifier, a set-top box, a home automation control panel, a security control panel, a media box (e.g., a Samsung HomeSync™, an Apple TV™, or a Google TV™), a game console (e.g., an Xbox™ or a PlayStation™), an electronic dictionary, an electronic key, a camcorder, and an electronic picture frame.

In other example embodiments, the electronic apparatus may include at least one of various medical devices (e.g., various portable medical measuring devices such as a blood glucose meter, a heart rate meter, a blood pressure meter, a body temperature meter, and the like, a magnetic resonance angiography (MRA) device, a magnetic resonance imaging (MRI) device, a computed tomography (CT) device, an imaging device, an ultrasonic device, etc.), a navigator, a global navigation satellite system (GNSS), an event data recorder (EDR), a flight data recorder (FDR), an automobile infotainment device, a marine electronic device (e.g., a marine navigation device, a gyro compass, etc.), an avionic device, a security device, a head unit for a vehicle, an industrial or household robot, a drone, an automated teller machine (ATM) of a financial institution, a point of sales (POS) of a store, and an Internet of things (IoT) device (e.g., a light bulb, various sensors, a sprinkler device, a fire alarm, a thermostat, a street light, a toaster, exercise equipment, a hot water tank, a heater, a boiler, etc.). According to the example embodiments, the electronic apparatus may include at least one of a part of furniture, a building, a structure, or an automobile, an electronic board, an electronic signature receiving device, a projector, and various measuring devices (e.g., water, electricity, gas, or radio wave measuring devices, etc.). In the example embodiments, the electronic apparatus may be flexible or may be a combination of two or more of the various apparatuses described above. The electronic apparatus according to the example embodiments in this specification is not limited to the above-described devices. In this specification, the term "user" may refer to a person who uses an electronic apparatus or an apparatus (e.g., an artificial intelligence electronic apparatus) that uses an electronic apparatus.

FIG. 1 is a diagram of views illustrating a situation in which an electronic apparatus displays a 360 degree image, according to example embodiments.

Referring to FIG. 1, an electronic apparatus 100 according to example embodiments may display a 360 degree image. According to example embodiments, the 360 degree image may be an image having a 360 degree angle of view. For example, the 360 degree image may be an image generated based on a plurality of images that are captured in a 360 degree direction by using at least one camera. In this case, the plurality of captured images may be mapped to a sphere, and contact points of the mapped images may be connected (stitched) to each other so that a spherical 360 degree image may be generated. Further, the spherical 360 degree image may be converted into a plane 360 degree image 10 as illustrated in FIG. 1 to be transmitted to or stored in another device.

The electronic apparatus 100 according to example embodiments may convert the plane 360 degree image 10 into a spherical 360 degree image 20 by performing graphic processing on the plane 360 degree image 10. For example, the electronic apparatus 100 may map a plane 360 degree image onto a sphere to generate the spherical 360 degree image 20.

The electronic apparatus 100 may select a region 25 of the spherical 360 degree image 20 and may display an image corresponding to the selected region 25 on a display. In this case, the electronic apparatus 100 may perform image quality processing on the image corresponding to the selected region 25 to display the image quality processed image on the display. The electronic apparatus 100 may perform image quality processing on the image corresponding to the selected region 25 by using various methods. For example, the electronic apparatus 100 may perform image quality processing on the image corresponding to the selected region 25 by using a projection method such as rectilinear projection, Pannini projection, stereographic projection, etc. Also, the electronic apparatus 100 may scale and display an image according to a resolution of the display.

The electronic apparatus 100 according to example embodiments may be a TV, but this is an example embodiment, and the electronic apparatus 100 may be implemented as various electronic apparatuses including a display. For example, as described above, the electronic apparatus 100 may be implemented as various electronic apparatuses such as a cellular phone, a smart phone, a tablet PC, a digital camera, a desktop computer, an electronic book terminal, a digital broadcasting terminal, a wearable device, etc.

Example embodiments of the present disclosure may be easily implemented in a display device having a large display such as a TV, but the present disclosure is not limited thereto. Further, the electronic apparatus 100 may be a fixed or portable type, and may be a digital broadcasting receiver capable of receiving digital broadcasting.

The electronic apparatus 100 may be implemented as a flat display device, a curved display device that is a screen having a curvature, or a flexible display device having an adjustable curvature. The electronic apparatus 100 may have, for example, high definition (HD) resolution, full HD resolution, ultra HD resolution, or a clearer output resolution than the ultra HD resolution.

According to example embodiments, the electronic apparatus 100 may be integrated with a display, or may be configured separately from the display to display an image on the display through wired or wireless communication.

According to example embodiments, the electronic apparatus 100 may be controlled by a control apparatus, and the control apparatus may be implemented as various types of devices, such as a remote control, a smart phone, or the like, for controlling the electronic apparatus 100.

Further, the control apparatus may control the electronic apparatus 100 by using short-distance communication including Infrared Data Association (IrDA) or Bluetooth. The control apparatus may control a function of the electronic apparatus 100 by using at least one of a provided key (including a button), a touch pad, a microphone capable of receiving a user's voice, and a sensor capable of recognizing a motion of the control apparatus.

According to example embodiments, an image reproduced by the electronic apparatus 100 is not limited to the 360 degree image. For example, the electronic apparatus 100 may reproduce a panoramic image. The panoramic image may be, for example, an image generated based on a plurality of images that are captured while changing a capturing direction by using at least one camera. The panoramic image may be generated by using a method similar to a method of generating the 360 degree image described above, but may have various capturing angles of view such as 30 degrees, 90 degrees, 180 degrees, and the like. Further, the electronic apparatus 100 may reproduce a plane image having a fixed capturing angle of view. Hereinafter, a description will be given assuming a case in which the electronic apparatus 100 reproduces a 360 degree image.

FIG. 2 is a block diagram of a schematic configuration of the electronic apparatus according to example embodiments.

Referring to FIG. 2, the electronic apparatus 100 according to example embodiments may include a controller 110 and a display 120. The configuration illustrated in FIG. 2 is not essential, and the electronic apparatus 100 according to example embodiments may be implemented to have more or fewer components than those illustrated in FIG. 2.

According to example embodiments, the controller 110 may process an image signal to input the image signal to the display 120. Accordingly, an image corresponding to the image signal may be displayed on the display 120. Further, the controller 110 may control the electronic apparatus 100 through a user instruction or an internal program.

According to example embodiments, the controller 110 may control the display 120 to display an image by using a first reproducing method. The controller 110 may identify an occurrence of at least one of a first event in which a user inputs a control signal and/or a second event in which a change related to content included in the image occurs.

The controller 110 may control the display 120 to display an image by changing the first reproducing method to a second reproducing method based on the event occurrence.

According to example embodiments, the display 120 generates a driving signal by converting an image signal, a data signal, an on-screen display (OSD) signal, a control signal, and the like, which are processed by the controller 110. The display 120 may be implemented as a plasma display panel (PDP), a liquid-crystal display (LCD), an organic light-emitting diode (OLED) display, a flexible display, or a three-dimensional (3D) display. Further, the display 120 may be used as an input device in addition to an output device by including a touch screen.

According to example embodiments, the display 120 may be a combination of a plurality of displays. For example, the display 120 may include a first display and a second display.

The display 120 according to example embodiments may display an image corresponding to a region of the 360 degree image, and the image displayed on the display 120 may be an image-quality-processed 360 degree image.

Figure 3:
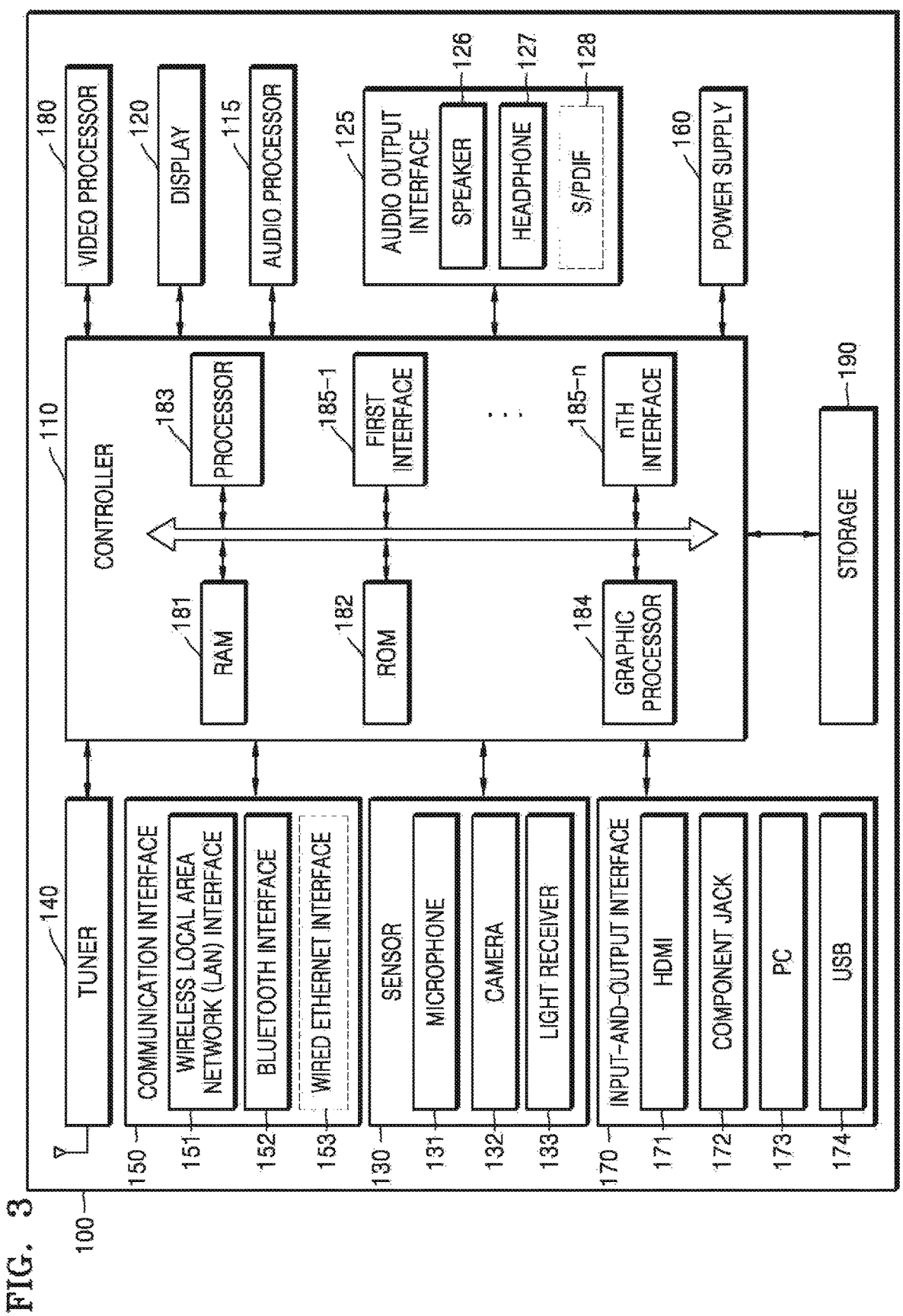
FIG. 3 is a block diagram of another schematic configuration of the electronic apparatus according to example embodiments.

FIG. 3 is a block diagram of another schematic configuration of the electronic apparatus according to example embodiments.

Referring to FIG. 3, the electronic apparatus 100 according to example embodiments may further include a video processor 180, an audio processor 115, an audio output interface 125, a power supply 160, a tuner 140, a communication interface 150, an input-and-output (I/O) interface 170, and a storage 190 in addition to the controller 110, the display 120, and a sensor 130.

The display 120 may be controlled by the controller 110 to display a video included in a broadcasting signal received through the tuner 140 on a screen. Further, the display 120 may display content (e.g., a moving picture) that is input through the communication interface 150 or the I/O interface 170. The display 120 may be controlled by the controller 110 to output an image stored in the storage 190. Further, the display 120 may display a voice user interface (UI) (e.g., including a voice command guide) for performing a voice recognition task corresponding to voice recognition or a motion UI (e.g., including a user motion guide for motion recognition) for performing a motion recognition task corresponding to motion recognition.

The audio processor 115 performs processing on audio data. In the audio processor 115, various processing such as decoding, amplification, noise filtering, and the like may be performed on the audio data. The audio processor 115 may include a plurality of audio processing modules to perform processing on audio corresponding to a plurality of pieces of content.

The audio output interface 125 is controlled by the controller 110 to output audio included in the broadcasting signal received through the tuner 140. The audio output interface 125 may output audio (e.g., voice or sound) that is input through the communication interface 150 or the I/O interface 170. Further, the audio output interface 125 may be controlled by the controller 110 to output audio stored in the storage 190. The audio output interface 125 may include at least one of a speaker 126, a headphone output terminal 127, and a Sony/Philips Digital Interface Format (S/PDIF) output terminal 128. The audio output interface 125 may include a combination of the speaker 126, the headphone output terminal 127, and the S/PDIF output terminal 128.

The power supply 160 is controlled by the controller 110 to supply power, which is input from an external power source, to internal elements of the electronic apparatus 100. Further, the power supply 160 may be controlled by the controller 110 to supply power, which is output from one or more batteries located in the electronic apparatus 100, to the internal elements.

The tuner 140 may tune and select only a frequency of a channel to be received by the electronic apparatus 100 from many radio wave components by performing amplification, mixing, resonance, etc. on a broadcasting signal that is received in a wired or wireless manner. The broadcasting signal includes audio, video, and additional information (e.g., an electronic program guide (EPG)).

The tuner 140 may receive a broadcasting signal in a frequency band corresponding to a channel number (e.g., a cable broadcasting channel number 506) according to a user input (e.g., a control signal that is received from the controller 110, for example, a channel number input, an up-down input of a channel, and a channel input in an EPG screen).

The tuner 140 may receive a broadcasting signal from various sources such as terrestrial broadcasting, cable broadcasting, satellite broadcasting, and Internet broadcasting. Alternatively, the tuner 140 may receive the broadcasting signal from a source such as analog broadcasting or digital broadcasting. The broadcasting signal received through the tuner 140 is decoded (e.g., audio decoding, video decoding, or additional information decoding) and divided into audio, video, and/or additional information. The divided audio, video, and/or additional information may be stored in the storage 190 by the control of the controller 110.

The number of the tuner 140 of the electronic apparatus 100 may be one or more. The tuner 140 may be implemented as all-in-one with the electronic apparatus 100, or may be implemented as a separate device (e.g., a set-top box) or a tuner that is connected to the I/O interface 170) having a tuner that is electrically connected to the electronic apparatus 100.

The communication interface 150 may be controlled by the controller 110 to connect the electronic apparatus 100 to an external device (e.g., an audio device and the like). The controller 110 may transmit and receive content to and from the external device connected through the communication interface 150, may download an application from the external device, or may browse the web. The communication interface 150 may include one of a wireless local area network (LAN) interface 151, a Bluetooth interface 152, and a wired Ethernet interface 153 according to performance and a structure of the electronic apparatus 100. Further, the communication interface 150 may include a combination of the wireless LAN interface 151, the Bluetooth interface 152, and the wired Ethernet interface 153. The communication interface 150 may be controlled by the controller 110 to receive a control signal of the controller 110. The control signal may be implemented as a Bluetooth type, a radio frequency (RF) signal type, or a WiFi type.

The communication interface 150 may further include other short-distance communication schemes (e.g., near field communication (NFC) and Bluetooth low energy (BLE) other than Bluetooth.

The sensor 130 may sense a user's voice, a user's image, or a user's interaction, and may include a microphone 131, a camera 132, and a light receiver 133.

The microphone 131 receives a user's utterance. The microphone 131 may convert the received utterance into an electrical signal and output the electrical signal to the controller 110. The user's utterance may include, for example, an utterance corresponding to a menu or function of the electronic apparatus 100.

The camera 132 may receive an image (e.g., a continuous frame) corresponding to the user's motion including a gesture within a camera recognition range. By using a recognition result of the received motion, the controller 110 may select a menu that is displayed on the electronic apparatus 100 or may perform control corresponding to the motion recognition result. For example, the control corresponding to the motion recognition result may include channel adjustment, volume adjustment, indicator movement, and cursor movement.

The light receiver 133 receives an optical signal (including a control signal), which is received from an external control apparatus, through a light receiving window of a bezel of the display 120. The light receiver 133 may receive an optical signal corresponding to the user's input (e.g., a touch, a press, a touch gesture, a voice, or a motion) from the control apparatus. A control signal may be extracted from the received optical signal by the control of the controller 110.

The I/O interface 170 is controlled by the controller 110 to receive a video (e.g., a moving picture and the like), an audio (e.g., voice, music, and the like), and additional information (e.g., EPG and the like) from the outside of the electronic apparatus 100. The I/O interface 170 may include one of a high-definition multimedia interface (HDMI) port 171, a component jack 172, a PC port 173, and a universal serial bus (USB) port 174. The I/O interface 170 may include a combination of the HDMI port 171, the component jack 172, the PC port 173, and the USB port 174.

The controller 110 controls the overall operation of the electronic apparatus 100 and a signal flow between the internal elements of the electronic apparatus 100, and performs a function of processing data. When there is a user input or a preset and stored condition is satisfied, the controller 110 may execute an operation system (OS) and various applications stored in the storage 190.

The controller 110 may include a random access memory (RAM) 181, which stores a signal or data input from the outside of the electronic apparatus 100 or is used as a storage region corresponding to various pieces of work that are performed in the electronic apparatus 100, a read only memory (ROM) 182 in which a control program for control is stored, and a processor 183.

The controller 110 according to example embodiments may display at least one region of an image to be displayed on the display 120 by using a first reproducing method, may identify the occurrence of at least one of a first event in which a control signal is externally received and a second event, which occurs based on a result of analysis of a feature of the image, and may change the first reproducing method to a second reproducing method based on the event occurrence.

When the controller 110 according to example embodiments changes a reproducing method based on a first event for changing a first reproduction region to a second reproduction region, the controller 110 may control the display 120 to display the entire image by using the second reproducing method, and may display a UI indicating a location of the first reproduction region on the entire image.

The controller 110 according to example embodiments may display a UI indicating a location of the second reproduction region on the entire image.

The controller 110 according to example embodiments may change, based on an external signal input, a location or a size of the UI indicating a location of the second reproduction region.

The controller 110 according to example embodiments may detect a linear component in a horizontal direction or a vertical direction by converting the at least one region into an edge image, which highlights and displays a contrast component, and when the number of detected linear components is greater than a predetermined number, or an average length of detected linear components is greater than a predetermined length, the controller 110 may change the first reproducing method to the second reproducing method.

When the number of faces increases by a predetermined number or greater in the at least one region, or a proportion of a face in the at least one region is equal to or greater than a predetermined value, the controller 110 may change the first reproducing method to the second reproducing method.

When the image changes into another image, capturing time and place of the image change, or an angle of view of the at least one region changes, the controller 110 may change the first reproducing method to the second reproducing method by analyzing a feature of a region to be changed and displayed.

The processor 183 may include a graphic processing unit (GPU) for processing graphics corresponding to video. The processor 183 may be implemented as a system on chip (SoC) in which a core processor is integrated with a GPU. The processor 183 may include a single-core processor, a dual-core processor, a triple-core processor, a quad-core processor, or other multi-core processors.

Further, the processor 183 may include a plurality of processors. For example, the processor 183 may be implemented as a main processor and a sub processor, which operates in a sleep mode.

First to $n^{th}$ interfaces 185-1 to 185-*n* are connected to the various elements described above. One of the interfaces may be a network interface that is connected to an external device through a network.

The RAM 181, the ROM 182, the processor 183, a graphic processor 184, and the first to $n^{th}$ interfaces 185-1 to 185-*n* may be connected to each other through an internal bus 186.

In the present example embodiment, the term "controller of an electronic apparatus" includes the processor 183, the ROM 182, and the RAM 181.

The storage 190 may be controlled by the controller 110 to store various pieces of data, programs, or applications for driving and controlling the electronic apparatus 100. The storage 190 may store input and output signals or data corresponding to driving of the video processor 180, the display 120, the audio processor 115, the audio output interface 125, the power supply 160, the tuner 140, the communication interface 150, the sensor 130, and the I/O interface 170. The storage 190 may store a control program for controlling the electronic apparatus 100 and the controller 110, an application originally provided by the manufacturer or downloaded from the outside, a graphical user interface (GUI) related to the application, an object for providing the GUI (e.g., image text, an icon, a button, and the like), user information, a document, databases, or pieces of related data.

In an example embodiment, the term "storage" includes the storage 190, the ROM 182 and the RAM 181 of the controller 110, or a memory card mounted in the electronic apparatus 100 (e.g., a micro secure digital (SD) card or an USB memory). Further, the storage 190 may include a non-volatile memory, a volatile memory, a hard disk drive (HDD), or a solid state drive (SSD).

Further, the electronic apparatus 100 having the display 120 may be electrically connected to a separate external device having a tuner (e.g., a set-top box). For example, the electronic apparatus 100 may be implemented as an analog TV, a digital TV, a 3D TV, a smart TV, a light-emitting diode (LED) TV, an OLED TV, a plasma TV, a monitor, or the like, but it will be easily understood by those skilled in the art that the present disclosure is not limited thereto.

The block diagrams of the electronic apparatus 100 illustrated in FIGS. 2 and 3 are block diagrams for an example embodiment. The elements in the block diagrams may be integrated, added, or omitted according to specifications of the actually implemented electronic apparatus 100. That is, two or more elements may be combined into one element, or one element may be divided into two or more elements. Further, a function that is performed in each block is intended to describe example embodiments, and an operation or device does not limit the scope of the present disclosure.

Figure 5A:
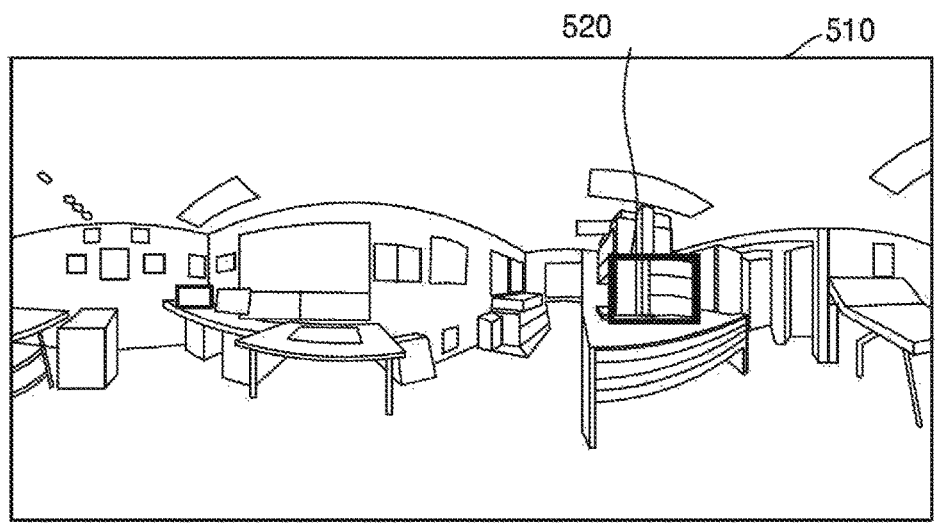
FIGS. 5A, 5B and 5C are views illustrating situations in which an image to be displayed changes according to a reproducing method in the electronic apparatus according to example embodiments.
Figure 5B:
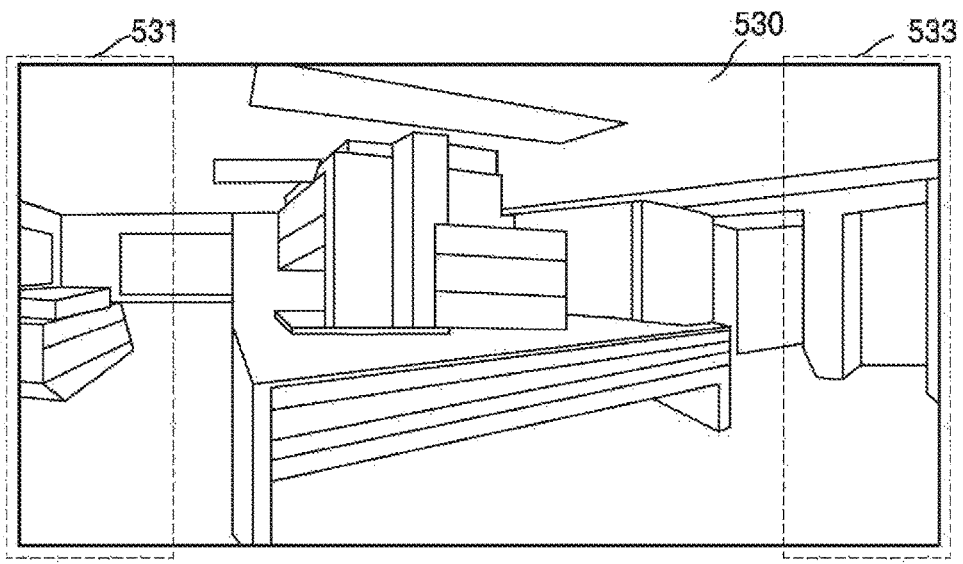
Figure 5C:
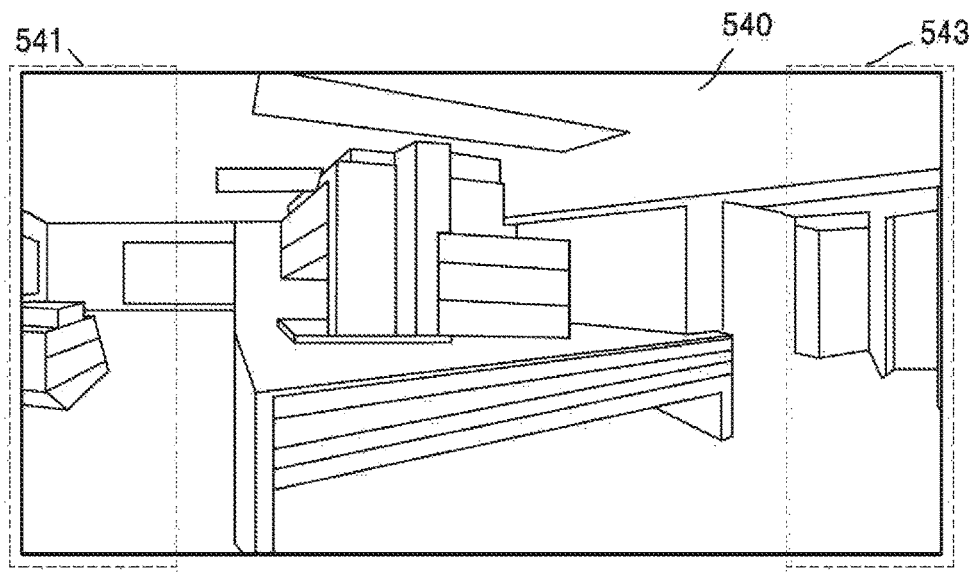

FIG. 4 is a flowchart illustrating a method of displaying an image in the electronic apparatus, according to example embodiments. FIGS. 5A, 5B and 5C are views illustrating situations in which an image to be displayed changes according to a reproducing method in the electronic apparatus according to example embodiments.

Referring to operation 410, the electronic apparatus 100 may display an image by using a first reproducing method.

According to example embodiments, the electronic apparatus 100 may reproduce a 360 degree image by using various methods. For example, the electronic apparatus 100 may use a reproducing method such as rectilinear projection, Pannini projection, stereographic projection, etc. Displaying an image by using a first reproducing method may refer to reproducing the image via the electronic apparatus 100 by selecting at least one of various projection types including rectilinear projection, Pannini projection, stereographic projection, etc. as a first projection type.

Referring to FIG. 5A, the electronic apparatus 100 may display a 360 degree image 510. The 360 degree image 510 may be, for example, an image having a 360 degree angle of view.

According to example embodiments, the 360 degree image may be, as described above, an image having been stored in the storage 190 of the electronic apparatus 100 or an image input from the camera 132. The electronic apparatus 100 may convert a plane 360 degree image 510 into a spherical 360 degree image and reproduce the spherical 360 degree image. The electronic apparatus 100 may display a region of the 360 degree image 510 selected based on a center point 520 for reproducing the 360 degree image 510. The center point 520 may be a preset point or a point pre-selected by the user. According to other example embodiments, the center point 520 may be a feature point of the 360 degree image 510. The feature point may be, for example, a point at which a face of a subject is recognized, a point at which a contrast value is high, or a capturing start point of a 360 degree image.

Referring to FIGS. 5B and 5C, the electronic apparatus 100 may reproduce the 360 degree image 510. The electronic apparatus 100 may determine a region of the 360 degree image 510 to be displayed on the display 120, that is, an angle of view, based on aspect ratio information of the display 120 and a type and curvature information of the display 120. In addition, the electronic apparatus 100 may determine a reproducing method based on the determined angle of view and the curvature information.

For example, as illustrated in FIG. 5B, the display 120 of the electronic apparatus 100 may have an aspect ratio of 16:9 and may be configured as a curved display. The display 120 may have a curvature of 4200R. In this case, the electronic apparatus 100 may determine a horizontal angle of view of a first image 530 that is to be displayed on the display 120 as 155 degrees and a vertical angle of view thereof as 100 degrees. The electronic apparatus 100 may reproduce the first image 530 by using a rectilinear projection reproducing method. The first image 530 may be an image that the electronic apparatus 100 reproduces by using a first reproducing method.

Referring to FIG. 5C, as described above, when the display 120 has an aspect ratio of 16:9 and a curvature of 4200R, the electronic apparatus 100 according to example embodiments may display a second image 540 of the 360 degree image 510 having a horizontal angle of view of 155 degrees and a vertical angle of view of 100 degrees with respect to the center point 520 by using a Pannini projection reproducing method. The second image 540 may be an image that the electronic apparatus 100 reproduces by using a second reproducing method.

When a reproduction screen of FIG. 5B is compared to a reproduction screen of FIG. 5C, it may be seen that there is a difference between two images. For example, it may be seen that there are differences in form between left portions 531 and 541 of the first image 530 and the second image 540 and between right portions 533 and 543 of the first image 530 and the second image 540 even though the two images are images for the same subject. Horizontally elongated distortion occurs in the right portion 533 and the left portion 531 of the first image 530 when compared to the right portion 543 and the left portion 541 of the second image 540. Therefore, the electronic apparatus 100 may minimize distortion of an image to be reproduced by using a Pannini projection reproducing method among the two reproducing methods described above.

When the electronic apparatus 100 reproduces an image by using a Pannini projection reproducing method, the electronic apparatus 100 may further reduce distortion that occurs in the reproduced image by adjusting a reproduction parameter. According to example embodiments, a method of obtaining a reproduction parameter may vary according to an image reproducing method. Further, there may be no reproduction parameter according to the image reproducing method.

Figure 6:
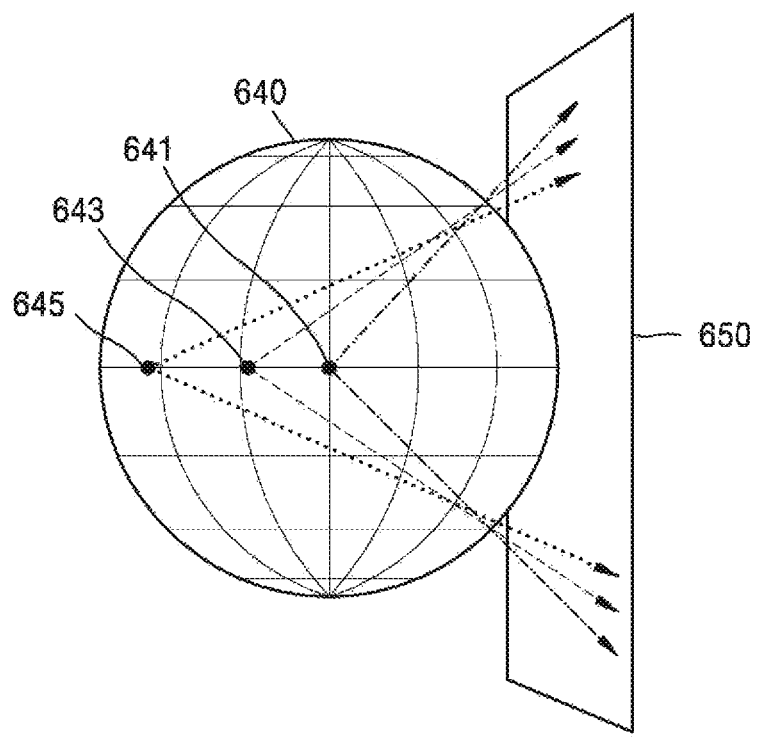
FIG. 6 is a view illustrating a situation in which the electronic apparatus calculates a reproduction parameter when a 360 degree image is reproduced by using a Pannini projection reproducing method, according to example embodiments.

FIG. 6 is a view illustrating a situation in which the electronic apparatus calculates a reproduction parameter when a 360 degree image is reproduced by using a Pannini projection reproducing method, according to example embodiments.

Referring to FIG. 6, a 360 degree image may be represented by mapping to a sphere 640. The electronic apparatus 100 may reproduce a region of the 360 degree image mapped to the sphere 640 in the form of projection on a plane 650. The plane 650 may be, for example, a side or screen to be displayed. In this case, the electronic apparatus 100 may change a location of an image projection start point to reduce distortion of the reproduced image. For example, the electronic apparatus 100 may project an image from a center point 641 of the sphere 640 as a projection start point toward the plane 650.

According to example embodiments, the electronic apparatus 100 may select a point further away from the plane 650 on which an image is displayed with respect to the center point 641 of the sphere 640 as a projection start point and project the image. For example, the electronic apparatus 100 may select a first point 643 or a second point 645 as a projection start point and project an image.

In this case, the reproduction parameter may be "a distance from the center of a sphere to a projection start point/a radius of the sphere." Therefore, when the center point 641 of the sphere 640 is a projection start point, the reproduction parameter may be "0." As the projection start point gradually moves away from the center point 641 of the sphere 640, an absolute value of the reproduction parameter may gradually increase.

As a horizontal angle of view of an image that will be reproduced decreases, a value of a reproduction parameter of the electronic apparatus 100 according to example embodiments may decrease, and an absolute value thereof may increase.

Referring back to FIG. 4, in operation 420, the electronic apparatus 100 may identify the occurrence of at least one of a first event and a second event.

According to example embodiments, the first event may mean that a signal for controlling the electronic apparatus 100 is externally received in regard to an image being reproduced to bring a change to the image being currently reproduced, and the second event may mean a change related to content of an image that is reproduced by the electronic apparatus 100 occurs.

For example, the first event in which a control signal is externally received may include zoom-in, zoom-out, an instruction for moving a reproduction region, and the like. A signal for controlling zoom-in, zoom-out, and movement of a reproduction region may be generated, for example, as the user manipulates the electronic apparatus 100. In detail, the user may execute zoom-in, zoom-out, and movement of a reproduction region by using wired and wireless controllers such as a button mounted in a remote control, a joystick, a mouse wheel, and a keyboard.

According to other example embodiments, the user may command zoom-in, zoom-out, and movement of a reproduction region by manipulating a UI displayed on a touchable display 120 or manipulating a touch pad.

According to other example embodiments, the electronic apparatus 100 may receive a control signal input from the user by using a motion recognition sensor. Further, when the user moves carrying a remote control, the electronic apparatus 100 may receive a control signal by sensing a distance from the remote control. For example, when the user moves carrying a portable small terminal such as a smartphone, the electronic apparatus 100 may measure a distance from the small terminal by using a BLE module.

According to example embodiments, the second event may occur based on a result of analysis of a feature of an image that the electronic apparatus 100 reproduces. The result of analysis of the feature of the image may be, for example, at least one of a case in which a predetermined number of faces or more appear in the image, a face is increased equal to or greater than a predetermined proportion in the image, the number of subjects in a horizontally or vertically linear form is equal to or greater than a predetermined number, an average length of subjects in a horizontally or vertically linear form is increased equal to or greater than a predetermined value, a main subject in the image approaches a boundary of the image and/or a case in which a vanishing point where much perspective occurs is detected in the image. According to other example embodiments, the result of analysis of the feature of the image may include a case in which an image being currently reproduced changes into another image, a case in which capturing time of the image is changed equal to or greater than a predetermined time, a case in which an image capturing place changes, or the like.

Referring to operation 430, the electronic apparatus 100 may display the image by changing the first reproducing method to a second reproducing method based on the event occurrence. For example, the electronic apparatus 100 may reproduce an image by using a Pannini projection reproducing method, and in response to a zoom-in signal input, may enlarge the image and reproduce an enlarged image. In this case, the electronic apparatus 100 may enlarge an image being reproduced by reducing an angle of view thereof, and to reduce resulting distortion, may reproduce an enlarged image by using a rectilinear projection reproducing method.

Displaying an image by using a second reproducing method may mean that the electronic apparatus 100 reproduces the image by using a second projection type different from the first projection type among various projection types including rectilinear projection, Pannini projection, stereographic projection, etc.

That is, displaying an image via the electronic apparatus 100 by changing the first reproducing method to a second reproducing method may refer to reproducing the image by using a first projection type and then reproducing the image by using a second projection type different from the first projection type based on predetermined event occurrence.

Figure 7:
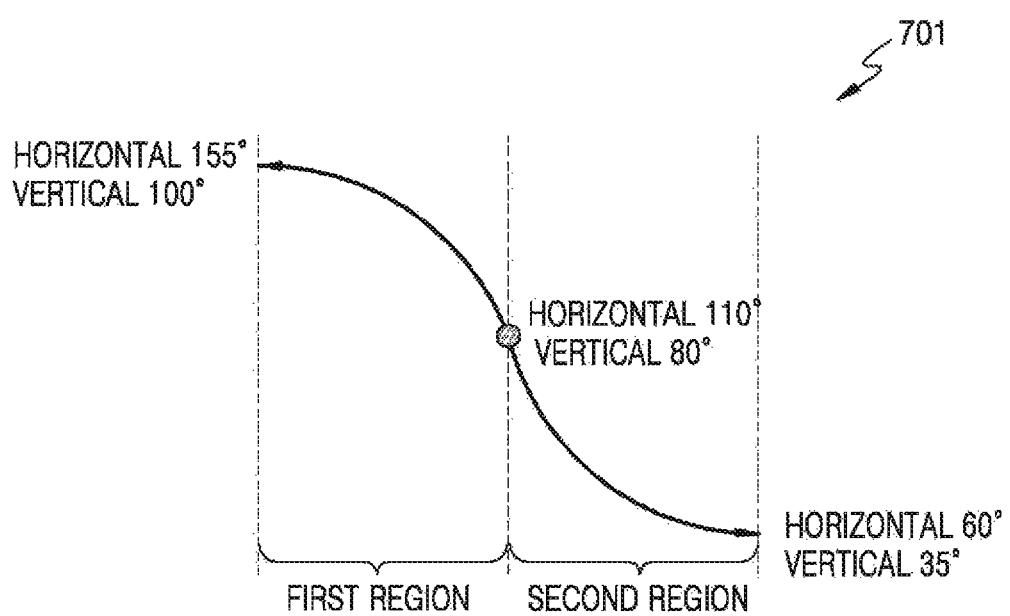
FIG. 7 is a view illustrating reproducing methods that are changed in association with a zooming operation while the electronic apparatus reproduces an image, according to example embodiments.

FIG. 7 is a view illustrating reproducing methods that are changed in association with a zooming operation while the electronic apparatus reproduces an image, according to example embodiments.

According to example embodiments, the electronic apparatus 100 may change an image reproduction angle of view based on a zooming signal input by the user. For example, the electronic apparatus 100 may change a horizontal angle of view from 60 degrees to 155 degrees and may change a vertical angle of view from 35 degrees to 100 degrees. However, the present disclosure is not limited thereto. The electronic apparatus 100 may display an angle of view from a narrower range to a wider range according to characteristics of the electronic apparatus 100. The characteristics of the electronic apparatus 100 may include a physical angle of view, a form (e.g., curved, spherical, variable), and aspect ratio of the display 120.

Referring to FIG. 7, a graph 701 displaying a range of an angle of view may make distinction between a first region and a second region according to a reproduction angle of view of an image. According to example embodiments, the first region may include an angle of view corresponding to a horizontal angle of view of an image to be reproduced between 155 degrees and 110 degrees and a vertical angle of view thereof between 100 degrees and 80 degrees. The second region may include an angle of view corresponding to a horizontal angle of view of an image to be reproduced between 110 degrees and 60 degrees and a vertical angle of view thereof between 80 degrees and 35 degrees.

However, the present disclosure is not limited thereto. The electronic apparatus 100 may set a range of an angle of view included in the first region to be wider or narrower according to reproduction characteristics. Similarly, the electronic apparatus 100 may set a range of an angle of view included in the second region to be wider or narrower according to reproduction characteristics.

According to example embodiments, the electronic apparatus 100 may match an image reproducing method right for each region, and then, when an image being reproduced has a corresponding angle of view, the electronic apparatus 100 may reproduce the image by using a preset reproducing method. For example, the electronic apparatus 100 may match a reproducing method that allows the user to feel less uncomfortable owing to little distortion at a wide angle of view with the first region. Further, the electronic apparatus 100 may match a method capable of reproducing an image without distortion like a camera showing a standard angle of view with the second region.

Hereinafter, example embodiments in which the electronic apparatus 100 changes a first reproducing method to a second reproducing method will be described.

FIGS. 8A and 8B are views illustrating a situation in which the electronic apparatus displays an image by changing a reproducing method from a first reproducing method to a second reproducing method based on a zooming operation, according to example embodiments.

Referring to FIG. 8A, the electronic apparatus 100 may display a portion of a 360 degree image as a first image 810. The 360 degree image may be, for example, an image having a 360 degree angle of view.

According to example embodiments, the 360 degree image may be, as described above, an image having been stored in the storage 190 of the electronic apparatus 100 or an image input from the camera 132. The electronic apparatus 100 may convert a plane 360 degree image into a spherical 360 degree image and reproduce the spherical 360 degree image. The electronic apparatus 100 may display a region of the spherical 360 degree image as the first image 810 on the display 120.

Referring to FIG. 8A, the electronic apparatus 100 may display the first image 810 by using a first reproducing method. The electronic apparatus 100 may display the first image 810, for example, at a horizontal angle of view of 155 degrees and a vertical angle of view of 100 degrees. Accordingly, the first reproducing method used by the electronic apparatus 100 may be a reproducing method capable of reducing distortion as much as possible at a wide angle of view.

In this case, a zoom-in operation that occurs due to a signal input by the user may allow the electronic apparatus 100 to change and display an angle of view of the first image 810 being displayed. Zoom-in and zoom-out signals may be generated, for example, as the user manipulates the electronic apparatus 100. In detail, the user may execute zoom-in and zoom-out by using wired and wireless controllers such as a button mounted in a remote control, a joystick, a mouse wheel, and a keyboard.

According to other example embodiments, the user may command zoom-in and zoom-out by manipulating a UI displayed on a touchable display 120 or manipulating a touch pad.

According to other example embodiments, the electronic apparatus 100 may receive a control signal input from the user by using a motion recognition sensor. Further, when the user moves carrying a remote control, the electronic apparatus 100 may receive a control signal by sensing a distance from the remote control. For example, when the user moves carrying a portable small terminal such as a smartphone, the electronic apparatus 100 may measure a distance from the small terminal by using a BLE module.

Referring to FIG. 8B, the electronic apparatus 100 may display a second image 820 having an angle of view changed in the first image 810. The electronic apparatus 100 may display the second image 820, for example, at a horizontal angle of view of 100 degrees and a vertical angle of view of 65 degrees. In this case, the electronic apparatus 100 may display the second image 820 by using a second reproducing method. The second reproducing method used by the electronic apparatus 100 may be a method capable of reproducing an image without distortion like a camera showing a standard angle of view.

As described above, the electronic apparatus 100 according to example embodiments of the present disclosure may automatically change a reproducing method according to a change in an angle of view of an image that is displayed on the display 120. Thus, the user may view an image having little distortion and a good image quality according to an angle of view of a display image.

FIGS. 9A and 9B are views illustrating a situation in which the electronic apparatus displays an image by changing a reproducing method from a first reproducing method to a second reproducing method based on an automatic zooming operation, according to example embodiments.

Referring to FIG. 9A, the electronic apparatus 100 may display a portion of a 360 degree image as a first image 910.

According to example embodiments, the 360 degree image may be, as described above, an image having been stored in the storage 190 of the electronic apparatus 100 or an image input from the camera 132. The electronic apparatus 100 may display a region of the 360 degree image as the first image 910 on the display 120.

Referring to FIG. 9A, the electronic apparatus 100 may display the first image 910 by using a first reproducing method. The electronic apparatus 100 may display the first image 910, for example, at a horizontal angle of view of 124 degrees and a vertical angle of view of 100 degrees. Accordingly, the first reproducing method used by the electronic apparatus 100 may be a reproducing method capable of reducing distortion as much as possible at a wide angle of view.

In this case, an automatic zoom-in operation may allow the electronic apparatus 100 to change and display an angle of view of the first image 910 being displayed. For example, the electronic apparatus 100 may find a vanishing point by analyzing the first image 910. The vanishing point may be, for example, a point at which at least two lines meet. The electronic apparatus 100 may automatically perform a zooming operation based on a vanishing point 915 detected in the first image 910.

According to example embodiments, there may be a plurality of vanishing points in an image. In this case, the electronic apparatus 100 may sequentially perform a zoom-in operation based on one vanishing point and display an image, and then, may perform a zoom-in operation based on the other vanishing point and display an image. However, the present disclosure is not limited thereto.

According to other example embodiments, the electronic apparatus 100 may perform, in response to a zoom-in signal that the user inputs, a zoom-in operation based on not a center of the first image 910 but a location of a vanishing point.

Referring to FIG. 9B, the electronic apparatus 100 may display a second image 920 having an angle of view changed in the first image 910. The electronic apparatus 100 may display the second image 920, for example, at a horizontal angle of view of 100 degrees and a vertical angle of view of 65 degrees. In this case, the electronic apparatus 100 may display the second image 920 by using a second reproducing method. The second reproducing method used by the electronic apparatus 100 may be a method capable of reproducing an image without distortion like a camera showing a standard angle of view.

As described above, the electronic apparatus 100 according to example embodiments of the present disclosure may automatically change a reproducing method according to a change in an angle of view of an image that is displayed on the display 120. Thus, the user may view an image having little distortion and a good image quality according to an angle of view of a display image.

Figure 10C:
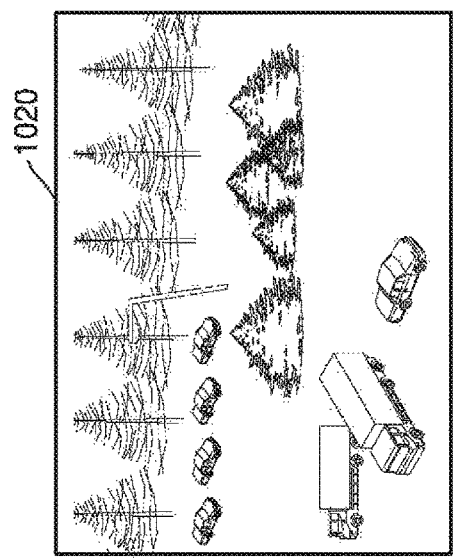
FIGS. 10A, 10B and 10C are views illustrating a situation in which, when a region for displaying an image is changed in the electronic apparatus, an image is displayed by changing a reproducing method from a first reproducing method to a second reproducing method, according to example embodiments.
Figure 10B:
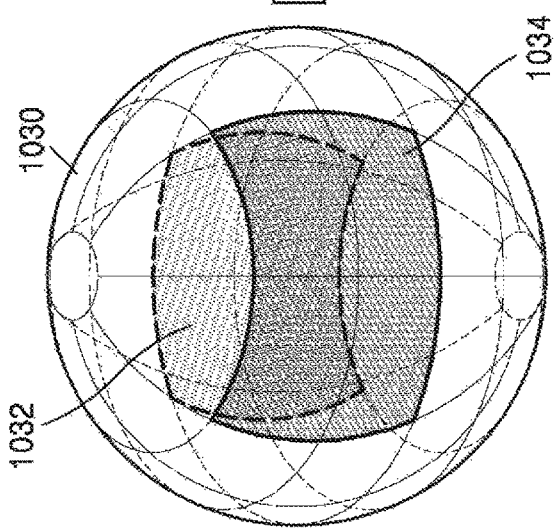
Figure 10A:
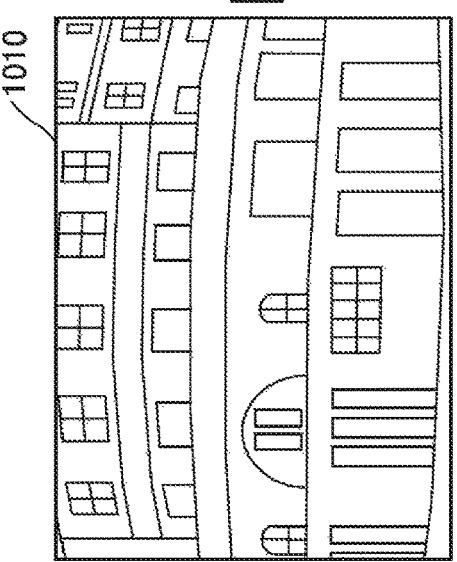

FIGS. 10A, 10B and 10C are views illustrating a situation in which, when a region for displaying an image is changed in the electronic apparatus, an image is displayed by changing a reproducing method from a first reproducing method to a second reproducing method, according to example embodiments.

Referring to FIGS. 10A and 10B, the electronic apparatus 100 may display a portion of a 360 degree image 1030 as a first image 1010.

According to example embodiments, the 360 degree image 1030 may be, as described above, an image having been stored in the storage 190 of the electronic apparatus 100 or an image input from the camera 132. The electronic apparatus 100 may display a region of the 360 degree image 1030 as the first image 1010 on the display 120.

Referring to FIG. 10A, the electronic apparatus 100 may display the first image 1010 by using a first reproducing method. The electronic apparatus 100 may display the first image 1010, for example, at a horizontal angle of view of 124 degrees and a vertical angle of view of 100 degrees.

In this case, a reproduction region movement operation that occurs due to a signal input by the user may allow the electronic apparatus 100 to change the first image 1010 being displayed to a second image 1020 to display the second image 1020.

Referring to FIG. 10B, while changing the first image 1010 to the second image 1020 to display the second image 1020, the electronic apparatus 100 may display the 360 degree image 1030 by using a second reproducing method. For example, the electronic apparatus 100 may reproduce the 360 degree image 1030 by selecting a reproducing method capable of showing the entire 360 degree image 1030 as a second reproducing method. However, a reproducing method is not limited thereto.

When the electronic apparatus 100 reproduces the 360 degree image 1030 by using the second reproducing method, the electronic apparatus 100 may display a region that the user has been viewing and may display a UI for guiding the user to select a region that the user intends to view. For example, the electronic apparatus 100 may display a region having being viewed by the user as a first UI element 1032.

According to example embodiments, a second UI element 1034 may display a region intended to be viewed by the user. As the user moves the second UI element 1034, the user may change a region to be viewed. A signal for controlling movement of a reproduction region may be generated, for example, as the user manipulates the electronic apparatus 100. In detail, the user may use wired and wireless controllers such as a button mounted in a remote control, a joystick, a mouse wheel, and a keyboard.

According to other example embodiments, the user may move the second UI element 1034 by manipulating a UI displayed on a touchable display 120 or manipulating a touch pad.

According to other example embodiments, the electronic apparatus 100 may receive a control signal input from the user by using a motion recognition sensor. Further, when the user moves carrying a remote control, the electronic apparatus 100 may receive a control signal by sensing a distance from the remote control. For example, when the user moves carrying a portable small terminal such as a smartphone, the electronic apparatus 100 may measure a distance from the small terminal by using a BLE module.

Referring to FIG. 10C, the electronic apparatus 100 may display the second image 1020 having a reproduction region changed in the first image 1010. The first image 1010 and the second image 1020 may have the same angle of view although a reproduction region has changed. Further, the electronic apparatus 100 may display the second image 1020 by using the first reproducing method. However, the present disclosure is not limited thereto. For example, the user may change an angle of view of the second image 1020 by using the second UI element 1034. When an angle of view of the second image 1020 changes, the electronic apparatus 100 may display the second image 1020 by using a third reproducing method.

As described above, the electronic apparatus 100 according to example embodiments of the present disclosure may automatically change a reproducing method according to a change in a range of an image that is displayed on the display 120. Thus, the user may identify a location of an image being currently viewed from a 360 degree image, and may determine a location of an image that is to be viewed in the future.

Figure 11A:
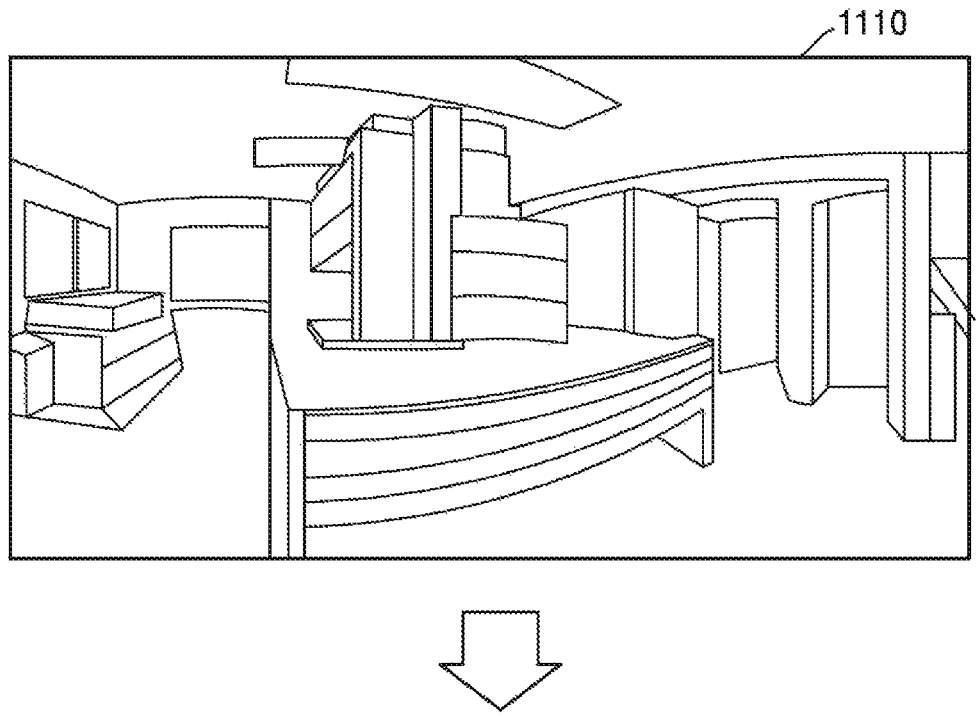
FIGS. 11A and 11B are views illustrating a situation in which the electronic apparatus displays an image by changing a reproducing method from a first reproducing method to a second reproducing method by analyzing a feature of an image being reproduced, according to example embodiments.
Figure 11B:
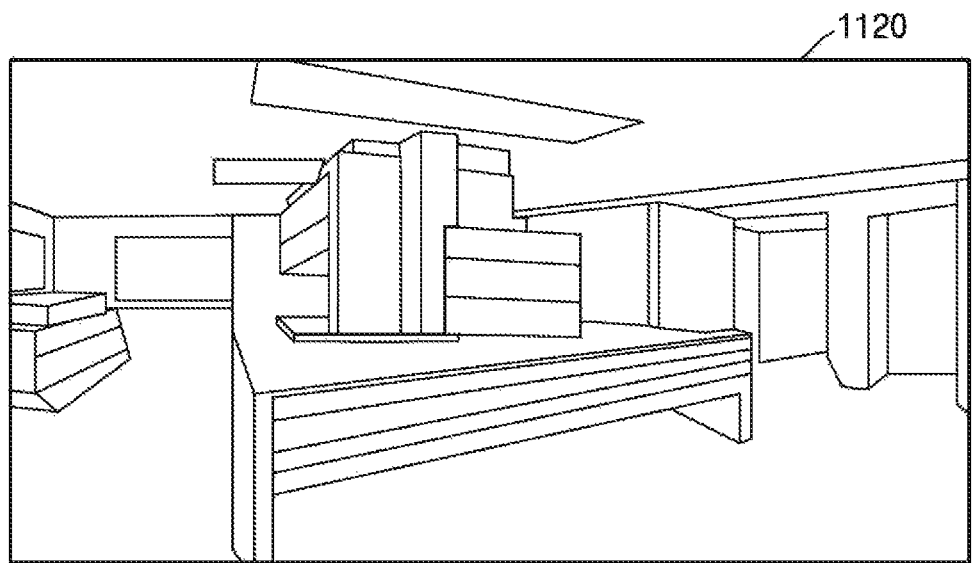

FIGS. 11A and 11B are views illustrating a situation in which the electronic apparatus displays an image by changing a reproducing method from a first reproducing method to a second reproducing method by analyzing a feature of an image being reproduced, according to example embodiments.

Referring to FIG. 11A, the electronic apparatus 100 may display a portion of a 360 degree image as a first image 1110.

According to example embodiments, the 360 degree image may be, as described above, an image having been stored in the storage 190 of the electronic apparatus 100 or an image input from the camera 132. The electronic apparatus 100 may display a region of the 360 degree image as the first image 1110 on the display 120.

Referring to FIG. 11A, the electronic apparatus 100 may display the first image 1110 by using a first reproducing method. The electronic apparatus 100 may display the first image 1110, for example, at a horizontal angle of view of 155 degrees and a vertical angle of view of 100 degrees.

In this case, the electronic apparatus 100 may display a second image 1120 by changing the first reproducing method to a second reproducing method by analyzing a feature of a subject included in the first image 1110. For example, the electronic apparatus 100 may display an image with an edge component by emphasizing a contrast component of the first image 1110.

According to example embodiments, the electronic apparatus 100 may detect a linear component in a horizontal direction and/or a vertical direction, which is included in the first image 1110, by using an edge image. When the number of detected linear components in the horizontal direction and/or the vertical direction is greater than a predetermined number, and an average length of detected linear components in the horizontal direction and/or the vertical direction is greater than a predetermined length, the electronic apparatus 100 may change the first reproducing method to a reproducing method capable of maintaining straight lines as much as possible.

Referring to FIG. 11B, the electronic apparatus 100 may display the second image 1120 by using the second reproducing method. The electronic apparatus 100 may display the second image 1120 at a horizontal angle of view of 155 degrees and a vertical angle of view of 100 degrees, which is the same angle of view as that of the first image 1110. The electronic apparatus 100 may display the second image 1120, for example, by using a rectilinear projection reproducing method as the second reproducing method.

In detail, it may be seen that distortion in which straight lines on a left region and a right region of the first image 1110 look curved does not appear in a left region and a right region of the second image 1120.

As described above, the electronic apparatus 100 according to example embodiments of the present disclosure may automatically change a reproducing method according to characteristics of a subject included in an image that is displayed on the display 120. Thus, the user may view an image having little distortion and a good image quality.

Figure 12A:
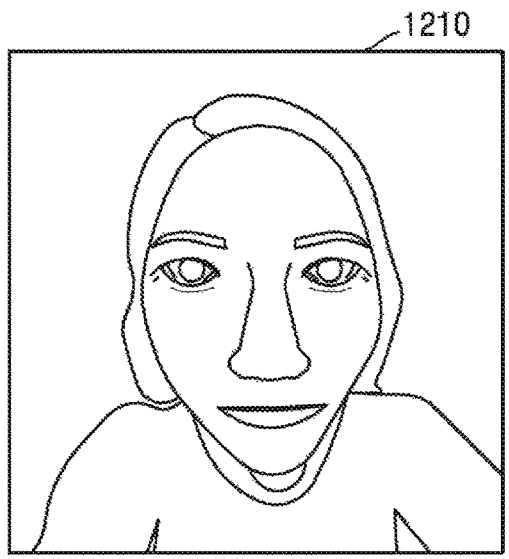
FIGS. 12A and 12B are views illustrating a situation in which the electronic apparatus displays an image by changing a reproducing method from a first reproducing method to a second reproducing method based on a size of a face included in an image being reproduced, according to example embodiments.
Figure 12B:
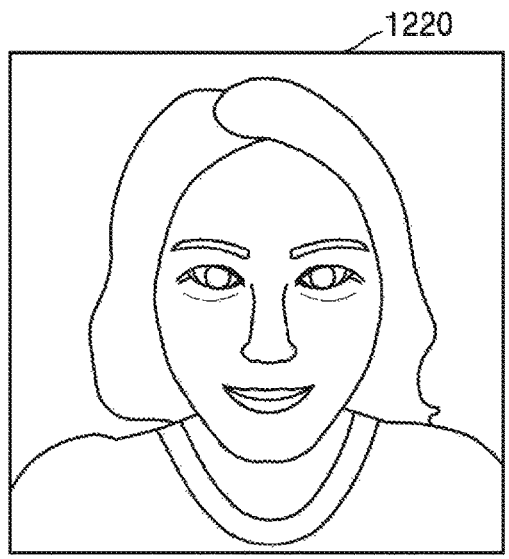

FIGS. 12A and 12B are views illustrating a situation in which the electronic apparatus displays an image by changing a reproducing method from a first reproducing method to a second reproducing method based on a size of a face included in an image being reproduced, according to example embodiments.

Referring to FIG. 12A, the electronic apparatus 100 may display a portion of a 360 degree image as a first image 1210.

Referring to FIG. 12A, the electronic apparatus 100 may display the first image 1210 by using a first reproducing method. The electronic apparatus 100 may display the first image 1210, for example, at a horizontal angle of view of 124 degrees and a vertical angle of view of 100 degrees.

In this case, the electronic apparatus 100 may display a second image 1220 by changing the first reproducing method to a second reproducing method based on a size of a face included in the first image 1210. For example, the electronic apparatus 100 may convert the first image 1210 to an image represented with an edge component by emphasizing a contrast component.

According to example embodiments, the electronic apparatus 100 may detect a size of a face included in the first image 1210 by using an edge image. The electronic apparatus 100 may calculate a proportion of the detected size of the face in the entire size of the first image 1210. When the proportion of the detected size of the face in the entire size of the first image 1210 is greater than a predetermined proportion, the electronic apparatus 100 may change the first reproducing method to a reproducing method causing little distortion.

According to other example embodiments, even when the number of faces detected in the first image 1210 is greater than a predetermined number, the electronic apparatus 100 may change the first reproducing method to the second reproducing method. Further, when a distance between a face detected in the first image 1210 and an image capturing apparatus having captured an image of the face is close to have a predetermined value or greater, the electronic apparatus 100 may change the first reproducing method to the second reproducing method.

Referring to FIG. 12B, the electronic apparatus 100 may display the second image 1220 by using the second reproducing method. The electronic apparatus 100 may display the second image 1220 at a horizontal angle of view of 124 degrees and a vertical angle of view of 100 degrees, which is the same angle of view as that of the first image 1210.

As described above, the electronic apparatus 100 according to example embodiments of the present disclosure may automatically change a reproducing method based on a proportion of a face included in an image that is displayed on the display 120. Thus, the user may view an image having little distortion and a good image quality.

FIGS. 13A and 13B are views illustrating a situation in which the electronic apparatus displays an image by changing a reproducing method from a first reproducing method to a second reproducing method by analyzing an information related to image capturing included in an image being reproduced, according to example embodiments.

Referring to FIG. 13A, the electronic apparatus 100 may display a portion of a 360 degree image as a first image 1310.

Referring to FIG. 13A, the electronic apparatus 100 may display the first image 1310 by using a first reproducing method. The electronic apparatus 100 may display the first image 1310, for example, at a horizontal angle of view of 155 degrees and a vertical angle of view of 100 degrees.

In this case, the electronic apparatus 100 may display a second image 1320 by changing the first reproducing method to a second reproducing method by analyzing information related to image capturing included in the first image 1310. For example, when there is a considerable difference in capturing time of the first image 1310 and the second image 1320, when an image capturing place changes, or when an image being reproduced changes into another image, the electronic apparatus 100 may sense a change and may analyze again a feature of an image having changed. For example, the electronic apparatus 100 may display the second image 1320 by using the second reproducing method based on a change in an angle of view, a feature of a subject included in the image, or the like.

Referring to FIG. 13B, the electronic apparatus 100 may display the second image 1320 by using the second reproducing method. The electronic apparatus 100 may identify that an angle of view of the second image 1320 is wider than that of the first image 1310 and may use a reproducing method capable of reducing distortion at a wide angle of view to display the second image 1320. The electronic apparatus 100 may display the second image 1320, for example, by using a Pannini projection reproducing method as the second reproducing method.

Figure 14A:
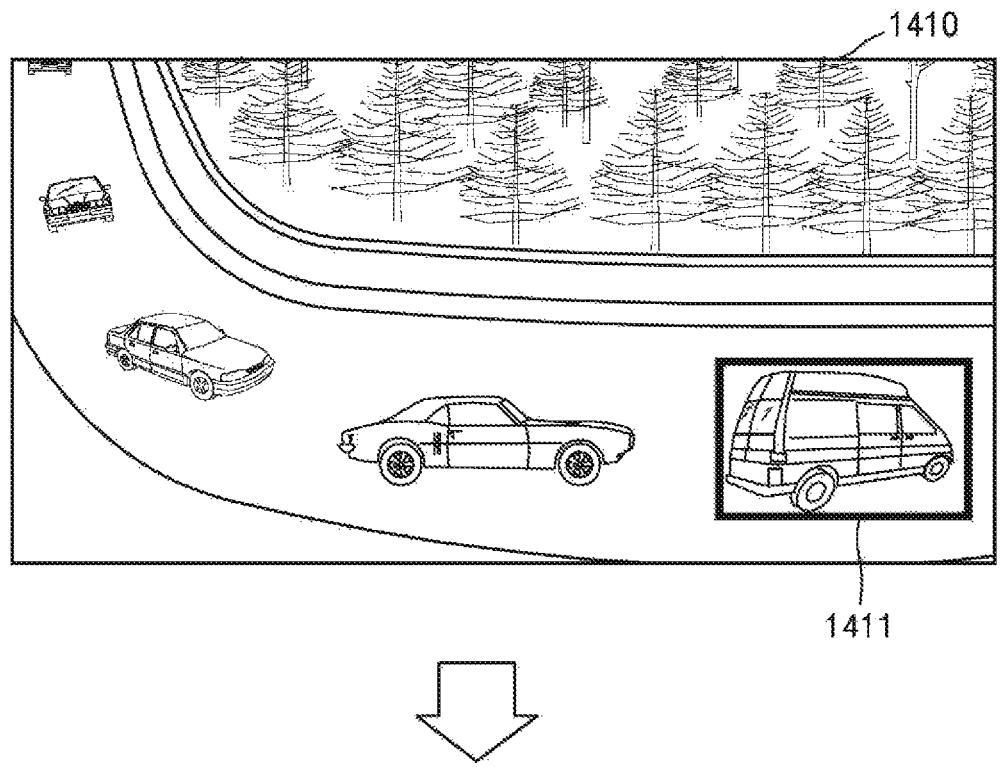
FIGS. 14A and 14B are views illustrating a situation in which, when an angle of view of an image being reproduced changes, the electronic apparatus displays an image by changing a reproducing method from a first reproducing method to a second reproducing method, according to example embodiments.
Figure 14B:
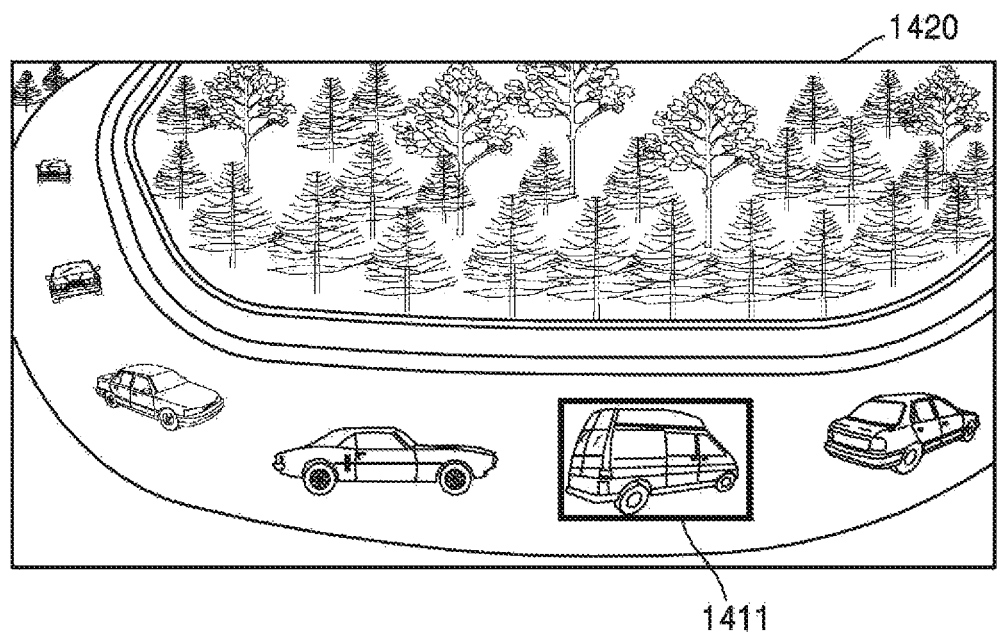

FIGS. 14A and 14B are views illustrating a situation in which, when an angle of view of an image being reproduced changes, the electronic apparatus displays an image by changing a reproducing method from a first reproducing method to a second reproducing method, according to example embodiments.

Referring to FIG. 14A, the electronic apparatus 100 may display a portion of a 360 degree image as a first image 1410.

Referring to FIG. 14A, the electronic apparatus 100 may display the first image 1410 by using a first reproducing method. The electronic apparatus 100 may display the first image 1410, for example, at a horizontal angle of view of 124 degrees and a vertical angle of view of 100 degrees.

In this case, when an angle of view of the first image 1410 automatically changes, the electronic apparatus 100 may display a second image 1420 by using a second reproducing method based on the changed angle of view. For example, when a main subject 1411 detected in the first image 1410 approaches a region 1415 at the edge of the display 120, the electronic apparatus 100 may widen an angle of view of the first image 1410.

Further, when the main subject 1411 detected in the first image 1410 approaches the region 1415 at the edge of the display 120, the electronic apparatus 100 may display the first image 1410 to locate the main subject 1411 in a center portion of the display 120.

According to other example embodiments, when the main subject 1411 detected in the first image 1410 is reduced by as much as a predetermined size or greater and is displayed, the electronic apparatus 100 may display an image by narrowing an angle of view of the image. On the contrary, when the main subject 1411 detected in the first image 1410 is enlarged by as much as a predetermined size or greater and is displayed, the electronic apparatus 100 may display an image by widening an angle of view of the image.

Referring to FIG. 14B, as described above, when an angle of view of the first image 1410 being reproduced changes, the electronic apparatus 100 may use the second reproducing method capable of reducing distortion at the changed angle of view and maintaining image quality to display the second image 1420.

The electronic apparatus according to example embodiments of the present disclosure includes a display for displaying an image and a controller electrically connected to the display. The controller displays at least one region of an image to be displayed on the display by using a first reproducing method, identifies the occurrence of at least one of a first event in which a control signal is externally received and a second event, which occurs based on a result of analysis of a feature of the image, and changes the first reproducing method to a second reproducing method based on the event occurrence so that a reproducing method may be right for characteristics of an image being currently reproduced and distortion may be minimized. Accordingly, the electronic apparatus may provide an image that a user may conveniently view.

The term "module" used herein may include a unit composed of hardware, software, or firmware, and may be used interchangeably with terms such as logic, a logic block, a part, or a circuit. The module may be an integrally constructed part, a minimum unit that performs one or more functions, or a part thereof. The module may be implemented either mechanically or electronically, and may include, for example, an application-specific integrated circuit (ASIC) chip, field-programmable gate arrays (FPGAs), or a programmable logical device, that perform operations and are known or will be developed in the future. Devices (e.g., modules or functions thereof) or methods (e.g., operations) according to example embodiments may be at least partially implemented as commands stored in a non-transitory computer-readable storage medium (e.g., a memory) in the form of program modules. When the commands are executed by a processor, the processor may perform a function corresponding to the commands. The non-transitory computer-readable recording medium may include a hard disk, a floppy disk, a magnetic medium (e.g., a magnetic tape), an optical recording medium (e.g., a CD-ROM, a DVD, a magnetic-optical medium such as a floppy disk), and a built-in memory. The commands may include code generated by a compiler or code that may be executed by an interpreter. Modules or program modules according to example embodiments may include at least one or more of the elements described above, some elements may be omitted, or other elements may be further included. Operations performed by modules, program modules, or other components according to example embodiments may be performed sequentially, in parallel, repetitively, or heuristically, or at least some operations may be performed in a different order or omitted, or other operations may be added.

It may be understood that example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An electronic apparatus comprising:
a controller configured to:
control a display to display a 360 degree or panoramic image using a first projection reproducing method, the 360-degree image or panoramic image being a single image including a plurality of images captured in 360-degree directions or a plurality of directions by using at least one camera;
identify an occurrence of an event, the event including either one or both of a first event in which a control signal is externally received and a second event occurring based on a result of analyzing a feature of a region of the image currently being reproduced; and
control the display to display a region of the 360 degree or panoramic image using a second projection reproducing method, based on either one or both of the first event and the second event occurring,
wherein the first projection reproducing method comprises processing the region of the 360 degree or panoramic image, using a first projection type, and the second projection reproducing method comprises processing the region of the 360 degree or panoramic image, using a second projection type that is different from the first projection type,
wherein the first projection type and the second projection type correspond to one of: a rectilinear projection, a Pannini projection, or a stereographic projection, and the second projection reproducing method is a reproducing method in which distortion of the image is minimized.

2. The electronic apparatus of claim 1, wherein the first event in which the control signal is externally received comprises any one or any combination of a zoom-in signal, a zoom-out signal, or a change signal for changing a first reproduction region to a second reproduction region, being received.

3. The electronic apparatus of claim 2, wherein the controller is further configured to, in response to the first projection reproducing method being changed to the second projection reproducing method based on the first event in which the change signal for changing the first reproduction region to the second reproduction region is received:
control the display to display an entire portion of the 360 degree or panoramic image, using the second projection reproducing method; and
control the display to display a first user interface indicating a first location of the first reproduction region, on the entire portion of the 360 degree or panoramic image that is displayed.

4. The electronic apparatus of claim 3, wherein the controller is further configured to control the display to display a second user interface indicating a second location of the second reproduction region, on the entire portion of the 360 degree or panoramic image that is displayed.

5. The electronic apparatus of claim 4, wherein the controller is further configured to change, based on an external signal input, a location or a size of the second user interface that is displayed.

6. The electronic apparatus of claim 1, wherein the second event is an event that occurs based on the result of the analyzing the feature of the region of the image and comprises a first case of the second event occurring based on a proportion of a face in the region of the image, a first change in a number of faces in the region of the image, a number and an average length of linear components that are detected based on the region of the image, or a second change in an angle of view of the region of the image, and a second case of the second event occurring based on the image changing into another image, or a capturing time and a capturing place of the image changing.

7. The electronic apparatus of claim 1, wherein the controller is further configured to:
convert the region of the 360 degree or panoramic image into an edge image highlighting and displaying a contrast component;
detect, from the edge image, linear components that are horizontal and/or vertical; and
based on a number of the detected linear components being greater than a predetermined number, or an average length of the detected linear components being greater than a predetermined length, change the first projection reproducing method to the second projection reproducing method.

8. The electronic apparatus of claim 6, wherein the controller is further configured to change the first projection reproducing method to the second projection reproducing method based on the number of faces in the region of the image increasing by a predetermined number or greater, or a proportion of a face in the region of the 360 degree or panoramic image being greater than or equal to a predetermined value.

9. The electronic apparatus of claim 6, wherein the controller is further configured to, in response to the 360 degree or panoramic image changing into the other image, the capturing time and the capturing place of the 360 degree or panoramic image changing, or the angle of view of the region of the 360 degree or panoramic image changing, change the first projection reproducing method to the second projection reproducing method by analyzing another feature of another region that is displayed.

10. A method of controlling an electronic apparatus, the method comprising:
displaying a 360 degree or panoramic image using a first projection reproducing method, the 360-degree image or panoramic image being a single image including a plurality of images captured in 360-degree directions or a plurality of directions by using at least one camera;
identifying an occurrence of an event, the event including either one or both of a first event in which a control signal is externally received and a second event occurring based on a result of analyzing a feature of a region of the image currently being produced; and
displaying a region of the 360 degree or panoramic image using a second projection reproducing method, based on either one or both of the first event and the second event occurring,
wherein the first projection reproducing method comprises processing the region of the 360 degree or panoramic image, using a first projection type, and the second projection reproducing method comprises processing the region of the 360 degree or panoramic image, using a second projection type that is different from the first projection type,
wherein the first projection type and the second projection type correspond to one of: a rectilinear projection, a Pannini projection, or a stereographic projection, and the second projection reproducing method is a reproducing method in which distortion of the image is minimized.

11. The method of claim 10, wherein the first event in which the control signal is externally received comprises any one or any combination of a zoom-in signal, a zoom-out signal, or a change signal for changing a first reproduction region to a second reproduction region, being received.

12. The method of claim 11, further comprising, in response to the first projection reproducing method being changed to the second projection reproducing method based on a first event in which the change signal for changing the first reproduction region to the second reproduction region is received:
displaying an entire portion of the 360 degree or panoramic image, using the second projection reproducing method; and
displaying a first user interface indicating a first location of the first reproduction region, on the entire portion of the 360 degree or panoramic image that is displayed.

13. The method of claim 12, further comprising displaying a second user interface indicating a second location of the second reproduction region, on the entire portion of the 360 degree or panoramic image that is displayed.

14. The method of claim 10, wherein the first projection reproducing method comprises one of a rectilinear projection, a Pannini projection, or a stereographic projection, and
the second projection reproducing method comprises an image reproduction without distortion and/or with a standard angle of view.

15. The method of claim 10, wherein the second event is an event that occurs based on the result of the analyzing the feature of the region of the image and comprises a first case of the event occurring based on a proportion of a face in the region of the 360 degree or panoramic image, a first change in a number of faces in the region of the 360 degree or panoramic image, a number and an average length of linear components that are detected based on the region of the 360 degree or panoramic image, or a second change in an angle of view of the region of the 360 degree or panoramic image, and a second case of the second event occurring based on the 360 degree or panoramic image changing into another 360 degree or panoramic image, or a capturing time and a capturing place of the 360 degree or panoramic image changing.

16. The method of claim 10, further comprising:
converting the region of the 360 degree or panoramic image into an edge image highlighting and displaying a contrast component; and
detecting, from the edge image, linear components that are horizontal and/or vertical,
wherein the changing the first projection reproducing method to the second projection reproducing method comprises, based on a number of the detected linear components being greater than a predetermined number, or an average length of the detected linear components being greater than a predetermined length, changing the first projection reproducing method to the second projection reproducing method.

17. The method of claim 15, wherein the changing the first projection reproducing method to the second projection reproducing method comprises changing the first projection reproducing method to the second projection reproducing method in response to the number of faces in the region of the 360 degree or panoramic image increasing by a predetermined number or greater, or the proportion of the face in the region of the 360 degree or panoramic image being greater than or equal to a predetermined value.

18. The method of claim 15, wherein the changing the first projection reproducing method to the second projection reproducing method comprises, in response to the 360 degree or panoramic image changing into the other 360 degree or panoramic image, the capturing time and the capturing place of the 360 degree or panoramic image changing, or the angle of view of the region of the 360 degree or panoramic image changing, changing the first projection reproducing method to the second projection reproducing method by analyzing another feature of another region that is displayed.

19. A non-transitory computer-readable storage medium storing instructions the cause a computer to:
control a display to display 360 degree or panoramic image using a first projection reproducing method, the 360-degree image or panoramic image being a single image including a plurality of images captured in 360-degree directions or a plurality of directions by using at least one camera;
identify an occurrence of an event, the event including either one or both of a first event in which a control signal is externally received and a second event occurring based on a result of analyzing a feature of a region of the image currently being reproduced; and control the display to display a region of the 360 degree or panoramic image using a second projection reproducing method, based on either one or both of the first event and the second event occurring, wherein the first projection reproducing method comprises processing the region of the 360 degree or panoramic image, using a first projection type, and the second projection reproducing method comprises processing the region of the 360 degree or panoramic image, using a second projection type that is different from the first projection type, wherein the first projection type and the second projection type correspond to one of: a rectilinear projection, a Pannini projection, or a stereographic projection, and the second projection reproducing method is a reproducing method in which distortion of the image is minimized.

* * * * *